(12) United States Patent  
Edwards et al.

(10) Patent No.: US 9,103,529 B2  
(45) Date of Patent: Aug. 11, 2015

(54) PHOTOLUMINESCENT DAYLIGHT PANEL

(71) Applicant: Intematix Corporation, Fremont, CA (US)

(72) Inventors: Charles Edwards, Pleasanton, CA (US); Gang Wang, Milpitas, CA (US)

(73) Assignee: Intematix Corporation, Fremont, CA (US)

( * ) Notice: Subject to any disclaimer, the term of this patent is extended or adjusted under 35 U.S.C. 154(b) by 0 days.

(21) Appl. No.: 14/064,052

(22) Filed: Oct. 25, 2013

(65) Prior Publication Data

US 2014/0117253 A1     May 1, 2014

Related U.S. Application Data

(60) Provisional application No. 61/718,688, filed on Oct. 25, 2012.

(51) Int. Cl.
| | |
|---|---|
| G01N 21/64 | (2006.01) |
| F21V 9/16 | (2006.01) |
| F21S 11/00 | (2006.01) |
| E04D 13/03 | (2006.01) |
| C09K 11/77 | (2006.01) |
| F21V 13/08 | (2006.01) |

(52) U.S. Cl.
CPC .............. *F21V 9/16* (2013.01); *C09K 11/7734* (2013.01); *E04D 13/033* (2013.01); *F21S 11/00* (2013.01); *E04D 2013/0345* (2013.01); *F21V 13/08* (2013.01)

(58) Field of Classification Search
CPC ........................................ C09K 11/00
USPC ........................... 250/458.1, 459.1
See application file for complete search history.

(56) References Cited

U.S. PATENT DOCUMENTS 7,655,156 B2 *  2/2010  Cheng et al. ............ 252/301.4 F
2012/0301724 A1 * 11/2012  Frauenrath et al. ........ 428/411.1

FOREIGN PATENT DOCUMENTS

JP     2003218367 A * 7/2003 ............. H01L 31/04

* cited by examiner

*Primary Examiner* — Kiho Kim
(74) *Attorney, Agent, or Firm* — Vista IP Law Group, LLP

(57) ABSTRACT

A photoluminescent daylight panel for converting higher energy shorter wavelength daylight to lower energy longer wavelength light comprises: a light transmissive substrate; at least one photoluminescent material configured to absorb at least a portion of daylight radiation of wavelengths between about 350 nm and about 450 nm and convert it to light with a wavelength greater than about 600 nm.

42 Claims, 17 Drawing Sheets

PHOTOLUMINESCENT DAYLIGHT PANEL

CROSS-REFERENCE TO RELATED APPLICATIONS

This present application claims the benefit of priority to U.S. Provisional Application Ser. No. 61/718,688, filed Oct. 25, 2012, which is hereby incorporated by reference in its entirety.

FIELD

This disclosure relates to daylight panels, and in particular to daylight panels that convert the color temperature of daylight (sunlight) using one or more photoluminescent materials. More especially, although not exclusively, embodiments concern daylight panels that convert daylight into a warm white light product.

BACKGROUND

Although daylight (sunlight) passing through windows, skylights, and light tubes (also referred to as light pipes) can be used as a free source of high quality illumination, it typically has a correlated color temperature (CCT) between 5000-6500K, which is classified as "cool white" and may not be preferred for interior environments. As a result, offices and homes often use conventional artificial lighting during the day to generate a more desirable "warm white" light even though sufficient daylight is available. Offices and commercial properties typically use "warm white" light with a CCT between 3500-4000K and homes typically use a "warmer white" light with a CCT of 2700K.

When windows, skylights, and light tubes are used in commercial office spaces in combination with fluorescent lighting fixtures (typically fluorescent tube troffers), they tend to stand out due to their "cool white" color as compared with adjacent fluorescent fixtures. Although filtering could be used to adjust the CCT of daylight from a "cool white" color to a "warm white" color, filters employ a subtractive process and can reduce the amount of useable light by as much as 50% or more. Therefore, there is a need for a daylight panel that at least in part addresses these problems.

SUMMARY

Embodiments of the invention concern daylight panels that are capable of converting the color temperature of daylight using a photoluminescent material. In some embodiments, the daylight panel comprises a light transmissive substrate that includes a photoluminescent material, such as a phosphor or quantum dot material. The photoluminescent material converts a portion of the daylight, typically in the UV to blue part of the spectrum, to the orange and red part of the spectrum which combined with the remaining unconverted daylight generate a modified daylight emission product with a lower CCT.

According to one embodiment a photoluminescent daylight panel for converting higher energy shorter wavelength daylight to lower energy longer wavelength light, comprises: a light transmissive substrate; at least one photoluminescent material configured to absorb at least a portion of daylight radiation of wavelengths between about 350 nm and about 450 nm and convert it to light with a wavelength greater than about 600 nm.

The at least one photoluminescent material can comprise one or more phosphors. Alternatively and/or in addition the at least one photoluminescent material comprises quantum dots.

Where the at least one photoluminescent material comprises a phosphor the phosphor preferably comprises a yellow or orange silicate-based phosphor and/or an orange aluminum-silicate-based phosphor. Preferably the orange silicate-based phosphor has a general composition $A_3Si(O,D)_5$ in which A is at least one of Sr, Ba, Mg and Ca and D is a at least one of Cl, F, N and S. More particularly, the silicate-based orange phosphor has the formula $(Sr_{1-x}M_x)_yEu_zSiO_5$, in which M is at least one of a divalent metal Ba, Mg, Ca and Zn; $0<x\leq0.5$; $2.6\leq y\leq3.3$; $0.001\leq z\leq0.5$ and subject to the proviso that y is not 3 when M is Ba.

The aluminum-silicate-based orange phosphor preferably has a general composition $(Sr_{1-x-y}M_xT_y)_{3-m}Eu_m(Si_{1-z}Al_z)O_5$, in which M is at least one of a divalent metal Ba, Mg, and Ca; T is a trivalent metal Y, La, Ce, Pr, Nd, Pm, Sm, Gd, Tb, Dy, Ho, Er, Tm, Yb, Lu, Th, Pa and U; $0\leq x\leq0.4$; $0\leq y\leq0.4$; $0\leq z\leq0.2$; and $0.001\leq m\leq0.5$. Such a phosphor can further comprise a halogen F, Cl or Br. It is believed that the halogen resides on oxygen lattice sites within the silicate crystal.

The silicate-based yellow phosphor preferably has a general composition $A_2Si(O,D)_4$ in which A comprises at least one Sr, Ca, Ba, Mg, Zn and Cd and D is a is at least one F, Cl, Br, I, P, S and N. In such phosphors the dopant D is present in an amount ranging from about 0.01 to 20 mole percent. It is believed that at least some of the dopant substitutes for oxygen anions to become incorporated into the crystal lattice of the phosphor. More particularly the silicate-based yellow phosphor has the formula $(Sr_{1-x}Ba_xM_y)_2Si(O,D)_4:Eu^{2+}$ in which $0\leq x\leq1$ and where $0\leq y\leq1$ when M is Ca; $0\leq y\leq1$ when M is Mg; and $0\leq y\leq1$ when M is Zn and Cd.

In preferred embodiment the at least one photoluminescent material is a phosphor selected from the group consisting of:
$Sr_{1.36}Ba_{0.55}Mg_{0.05}Eu_{0.10}Si_{1.03}O_4Cl_{0.18}$;
$Sr_{1.6}Ba_{0.35}Mg_{0.05}Eu_{0.06}Si_{1.03}O_4Cl_{0.12}$;
$Sr_{1.57}Ba_{0.34}Mg_{0.05}Eu_{0.10}Si_{1.03}O_4Cl_{0.18}$;
$Sr_{0.64}Ba_{0.27}Mg_{0.05}Eu_{0.10}Si_{1.03}O_4Cl_{0.18}$;
$Sr_3EU_{0.06}Si_{1.02}O_5F_{0.18}$;
$Sr_{2.94}Ba_{0.06}EU_{0.06}Si_{1.02}O_5F_{0.18}$;
$(Sr_{0.9}Ba_{0.1})_{2.76}Eu_{0.06}Si_{1.02}O_5F_{0.18}$;
$(Sr_{0.87}Ba_{0.1}Y_{0.03})_{2.94}Eu_{0.06}(Si_{0.9}Al_{0.1})O_5F_{0.18}$;
and combinations thereof.

In some embodiments the at least one photoluminescent material is incorporated within the light transmissive substrate. Alternatively, the at least one photoluminescent material can be distributed in a wavelength conversion layer on the light transmissive substrate.

Particularly where the photoluminescent material comprises one or more phosphors and to improve the visual appearance of the panel, the panel can further comprise a light diffusing layer on a surface of the layer of at least one photoluminescent material.

The panel can further comprise a second light transmissive substrate, the wavelength conversion layer being located between the light transmissive substrate and the second light transmissive substrate.

The light transmissive substrate can be substantially planar or alternatively arcuate in form and be convex or concave.

According to a further aspect of some embodiments of the invention, a light tube for providing daylight to an interior of a structure comprises: a first light transmissive surface exposed to the daylight; a second light transmissive surface exposed to the interior of the structure; and a light reflective tubular chamber for guiding light between the first surface and the second surface; and at least one photoluminescent material for converting higher energy shorter wavelength daylight to lower energy longer wavelength light, the at least one photoluminescent material configured to absorb at least a portion of daylight radiation of wavelengths between about 350 nm and about 450 nm and convert it to light with a wavelength greater than about 600 nm.

The at least one photoluminescent material can be included in the first and/or second surfaces and/or distributed in a light transmissive substrate located between the first and second surfaces.

The photoluminescent material can be distributed in a wavelength conversion layer, the wavelength conversion layer and a light transmissive substrate forming a panel that is situated between the first and second surfaces.

The panel can cover at least a part of an inner surface of the light tube.

Further details of aspects, objects, and advantages of the invention are described below in the detailed description, drawings and claims. Both the foregoing general description and the following detailed description are exemplary and explanatory, and are not intended to be limiting as to the scope of the invention.

BRIEF DESCRIPTION OF THE DRAWINGS

In order that the present invention is better understood, daylight panels, light tubes, a skylight and a window in accordance with embodiments of the invention will now be described, by way of example only, with reference to the accompanying drawings in which like reference numerals are used to denote like parts, and in which.

DETAILED DESCRIPTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

For the purposes of illustration only, the following description is made with reference to photoluminescent material embodied as phosphor materials. However, the invention is applicable to any type of photoluminescent material, such as for example quantum dots. A quantum dot is a portion of matter (e.g., semiconductor) whose excitons are confined in all three spatial dimensions that may be excited by excited by radiation energy to emit light of a particular wavelength or range of wavelengths. As such, the invention is not limited to phosphor material based daylight panels unless claimed as such.

Principle of Operation

As discussed earlier, many working environments utilize daylight (sunlight) that passes through windows, skylights, and light tubes as a free source of high quality illumination. However, daylight has a typical Correlated Color Temperature (CCT) between ≈5000K and ≈6500K, which is classified as "cool white" and may not be preferred for interior environments. As a result, offices, factories, homes and other environments capable of being lit by daylight, frequently use conventional artificial lighting (e.g., fluorescent lighting) during the day to generate a more desirable "warm white" light. Offices and commercial properties typically use "warm white" light with a CCT between about 3500K and about 4000K and homes typically use "warmer white" light with a CCT of about 2700K.

When windows, skylights, and light tubes are used in office spaces in combination with fluorescent lighting fixtures, they can stand out due to their cooler white appearance (i.e. higher CCT). Whilst filtering can be used to adjust the CCT of daylight from a "cool white" color to a "warm white" color, filtering is a subtractive process that may reduce the amount of useable light by as much as 50% or more.

Figure 1:
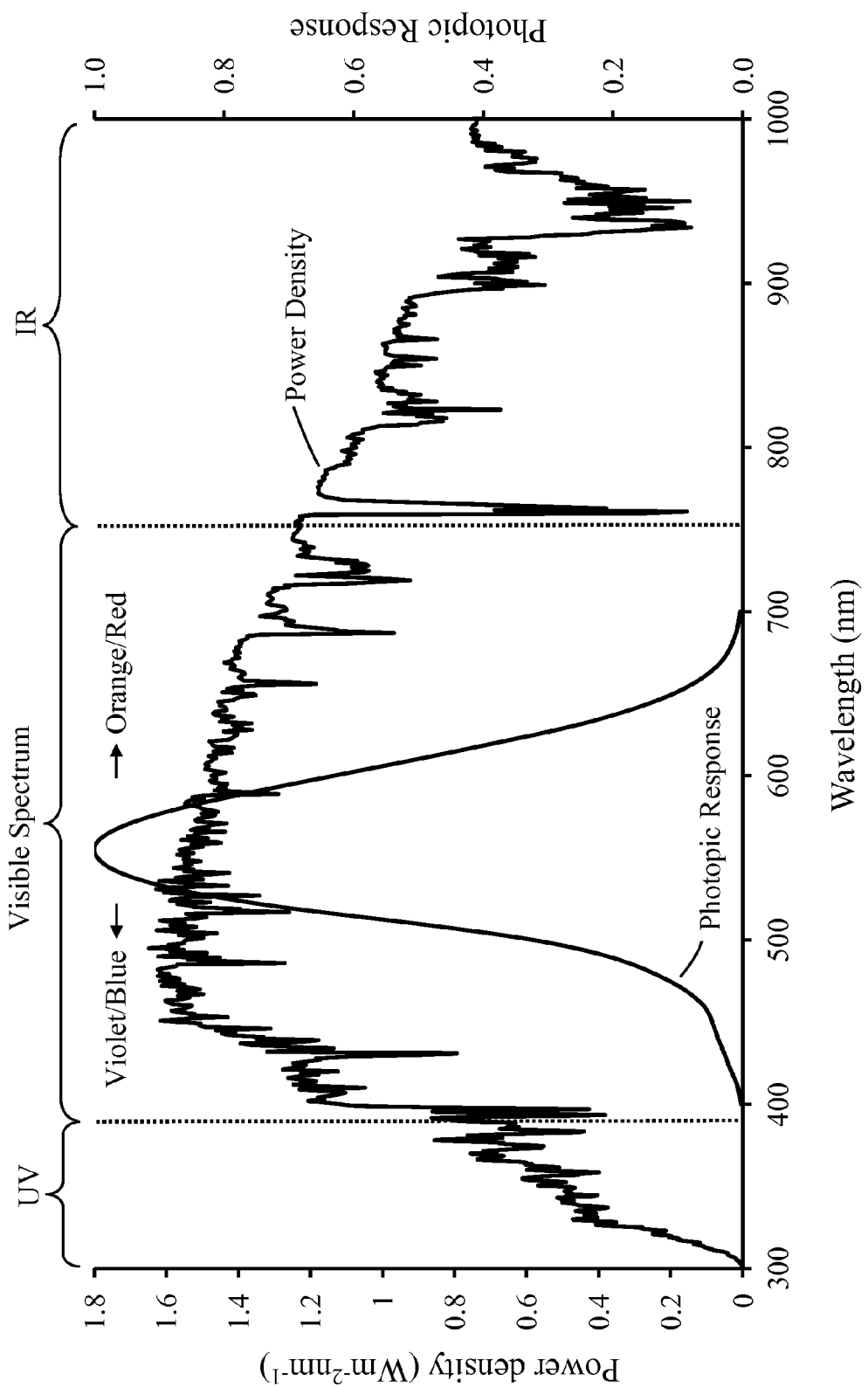
FIG. 1 illustrates the power density spectrum for daylight and photopic response of the human eye.

FIG. 1 is an example of the daylight color spectrum showing power density ($Wm^{-2} nm^{-1}$) versus wavelength (nm) for daylight (sunlight). The photopic response of the human eye (human eye sensitivity) is also shown in FIG. 1. As can be seen in the figure, the daylight spectrum includes a high power density (portion) of blue to violet light (e.g., wavelengths shorter than about 500 nm) and a relatively lower power density of orange to red light (e.g., wavelengths longer than about 600 nm). Because of the relatively higher power density of blue to violet light and the relatively lower power density of orange to red light, daylight exhibits a CCT of "cool white". To transform daylight to exhibit a CCT of "warm white" or "warmer white", the spectral content needs to be converted such that it includes a higher power density of orange to red light and a lower power density of blue to violet light.

The human eye is sensitive to at least three "colors" of light: red (R), green (G) and blue (B). As described above cool white light, such as daylight, has an abundance of blue light (light with a wavelength shorter than about 500 nm), plenty of green light, but relatively lower amounts of orange/red (light of wavelength longer than about 600 nm). The present invention resides in some respects to selectively converting at least a portion of the violet to blue light (e.g. light with wavelengths shorter than about 500 nm) into orange/red light (e.g. light with wavelengths longer than about 600 nm) to modify (convert) the daylight color to a balanced warm white. It is to be noted that the amount of green light should be balanced with the new amounts of blue and orange/red light, but may not need to be significantly shifted like the blue. A further benefit with daylight is the large amount of violet, near UV and UV light (350 nm to 430 nm) that is in the spectrum. These high energy photons generate far fewer lumens of light or no lumens at all since the human eye rapidly loses the ability to see short wavelength light of less than about 450 nm (see FIG. 1—Photopic response). Lumens are a measurement of the human's eye sensitivity to a specific color. Blue, violet and UV light have higher energy per photon but low lumens because the eye is not sensitive to these shorter wavelengths. By converting this shorter wavelength, low visibility, low lumen light into higher visibility longer wavelength orange/red, generates more lumens without sacrificing the more visible parts of the blue spectrum.

Daylight panels in accordance with embodiments of the invention utilize photoluminescent materials to convert blue and shorter wavelength light such as violet, near UV and UV regions of the daylight spectrum to light in the orange to red part of the spectrum thereby modifying the color temperature from a cool white to warm white. Phosphor materials used in fluorescent lighting are generally unsuitable for this application because they are designed for mercury generated UV light. As shown in FIG. 1 there is a relatively low amount of UV light in the daylight spectrum and such phosphor materials are consequently unsuitable. The inventors have discovered that the most efficient part of the spectrum for conversion is in the region 350 nm to 450 nm where there is available energy in daylight and the human eye sensitivity is low or nonexistent. An example of preferred phosphor materials that are efficient at conversion excitation radiation wavelengths of 350 nm to 450 nm are yellow and orange silicates-based phosphors and orange aluminum-silicate-based phosphors as described below. Such phosphors down convert (down converts in terms of energy) a broad range of shorter wavelength light into longer wavelength yellow or orange light spanning a range of wavelengths of about 500 nm to about 650 nm. Typically such orange phosphors have a peak emission wavelength of 570 nm to 590 nm. Although shorter wavelength light can be converted to red light this may be undesirable as the resulting converted daylight will not fall onto the black body curve and can result in a pink/violet cast to the daylight panel. As a result it is preferred, though not limited, to use yellow to orange photoluminescent materials.

Description of Exemplary Embodiments

Figure 2:
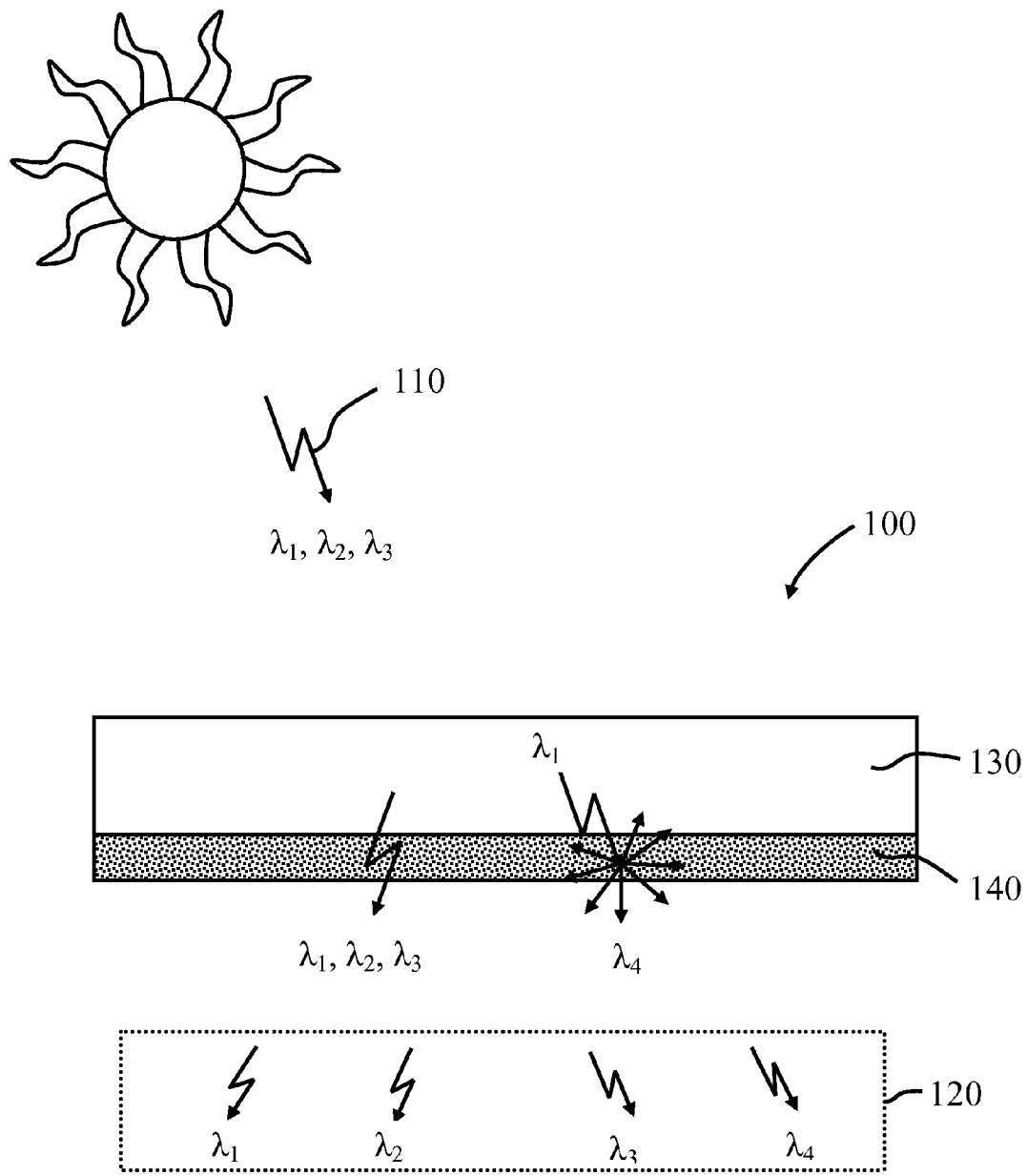
FIG. 2 is a schematic diagram of a daylight panel in accordance with an embodiment of the invention.

FIG. 2 is a schematic diagram of a daylight panel 100 in accordance with an embodiment of the invention. Daylight (Sunlight) 110 is represented by the symbols $\lambda_1$, $\lambda_2$, $\lambda_3$ where each symbol represents a different range of wavelengths that collectively make up the daylight spectrum. The symbol $\lambda_1$ represents the portion of the daylight having wavelengths below about 450 nm (i.e. typically 350 nm to 450 nm), the symbol $\lambda_2$ represents the portion of the daylight having wavelengths between about 450 nm and 600 nm and the symbol $\lambda_3$ represents the portion of daylight having wavelengths above about 600 nm (i.e. 600 nm to 750 nm). The daylight panel 100 is operable to absorb at least a proportion of the portion $\lambda_1$ of the daylight with wavelengths below about 450 nm and convert this into light having a wavelength $\lambda_4$ longer than about 600 nm. The daylight panel 100 also transmits the portions of the daylight $\lambda_2$ and $\lambda_3$ together with unconverted light of wavelengths $\lambda_1$. In this way, the modified daylight emission product 120 of the daylight panel 100 comprises a color spectrum that is a mixture of the wavelength distributions $\lambda_1$, $\lambda_2$, $\lambda_3$ and $\lambda_4$. As a result of the conversion, the emission product 120 now includes a higher power density of orange to red light and a reduced power density of blue to violet light, which results in a "warm white" or "warmer white" CCT that may be more preferable for use in offices and homes.

The daylight panel 100 of FIG. 2 comprises a light transmissive substrate 130 and a photoluminescent wavelength conversion layer 140.

The light transmissive substrate 130 can be any material that is substantially transmissive to light in a wavelength range from about 300 nm (ultra violet) to 740 nm (near infra red) and can include a light transmissive polymer such as a polycarbonate or acrylic or a glass such as a borosilicate glass, or any other suitable light transmissive material. In some embodiments, the light transmissive substrate 130 can be a planar shape, while in other embodiments the light transmissive substrate 130 can include other geometries such as being convex or concave in form such as for example being dome-shaped or cylindrical.

The wavelength conversion layer 140 may be deposited in direct contact with the light transmissive substrate 130 without any intervening layers or air gaps. The wavelength conversion layer may include one or more photoluminescent materials distributed within a light transmissive binder material. In one embodiment, one or more phosphor materials may be thoroughly mixed in known proportions with a liquid light transmissive binder material to form a suspension and the resulting phosphor composition, "phosphor ink", deposited directly onto the light transmissive substrate 130. The wavelength conversion layer 140 can be deposited by screen printing, although other deposition techniques such as slot die coating, spin coating or doctor blading can also be used. The wavelength conversion layer 140 is then cured to form the daylight panel 100. In some embodiments, the wavelength conversion layer 140 can be a planar shape, while in other embodiments the wavelength conversion layer 140 can include other geometries such as being convex or concave in form such as for example being dome shaped or cylindrical.

The wavelength conversion layer 140 is configured to absorb at least a proportion of the portion $\lambda_1$ of the incident daylight 110 and convert it into light of different, longer wavelengths $\lambda_4$ (typically orange to red). Light of wavelengths $\lambda_2$ and $\lambda_3$ that are not absorbed and converted by the wavelength conversion layer 140 are transmitted through the wavelength conversion layer 140 and contribute to the modified daylight emission product 120. The modified daylight emission product 120 of the daylight panel 100 is the combination of the unconverted wavelengths $\lambda_1$, wavelengths $\lambda_2$ and $\lambda_3$ of daylight transmitted by the wavelength conversion layer 140 and the wavelengths $\lambda_4$ of light generated by the wavelength conversion layer 140.

The color spectrum of the modified daylight emission product 120 emitted by the daylight panel 100 depends on the phosphor material composition and the quantity of phosphor material per unit area in the wavelength conversion layer 140. Typically, the wavelength conversion layer 140 can include a uniform distribution of the one or more phosphor materials. In other embodiments, the wavelength conversion layer 140 may include selective distribution or patterning of the one or more phosphor materials. Selective distribution or patterning of the one or more phosphor materials may allow for the daylight panel 100 to have clear areas (i.e. devoid of phosphor materials) for viewing, whereas a uniform distribution of the one or more phosphor materials may create a diffused daylight panel 100 with no clear areas for viewing. The use of selective distribution, patterning, or uniform distribution of phosphor materials within the wavelength conversion layer 140 of the daylight panel 100 is dependent on the particular application of the daylight panel 100. A non-uniform distribution of one or more phosphor materials may also be utilized, in which one or more phosphor materials are deposited in a linear, nonlinear, or other distribution along the thickness of the wavelength conversion layer 140.

The wavelength conversion layer 140 is preferably configured to absorb at least a proportion of the portion $\lambda_1$ of incident daylight with wavelengths below about 480 nm and convert that portion into light with a wavelength $\lambda_4$ above about 590 nm. However, it should be noted that the wavelength conversion layer 140 can be configured to absorb various different portions of incident daylight for converting into various different wavelengths. By configuring the wavelength conversion layer 140 with different combinations and/or distributions of the one or more phosphor materials, a modified daylight emission product 120 can have a spectrum with a higher power density of orange and red light and a lower power density of violet to blue light, which is a "warm white" or "warmer white" color that is more preferable for use in offices and homes. That is, the portions $\lambda_1$, $\lambda_2$ of daylight may be selected to be different portions of the daylight spectrum, and the portion $\lambda_1$ of the daylight may be converted to a different wavelength or set of wavelengths in order to provide light with a different CCT.

Photoluminescent Materials

Figure 3A:
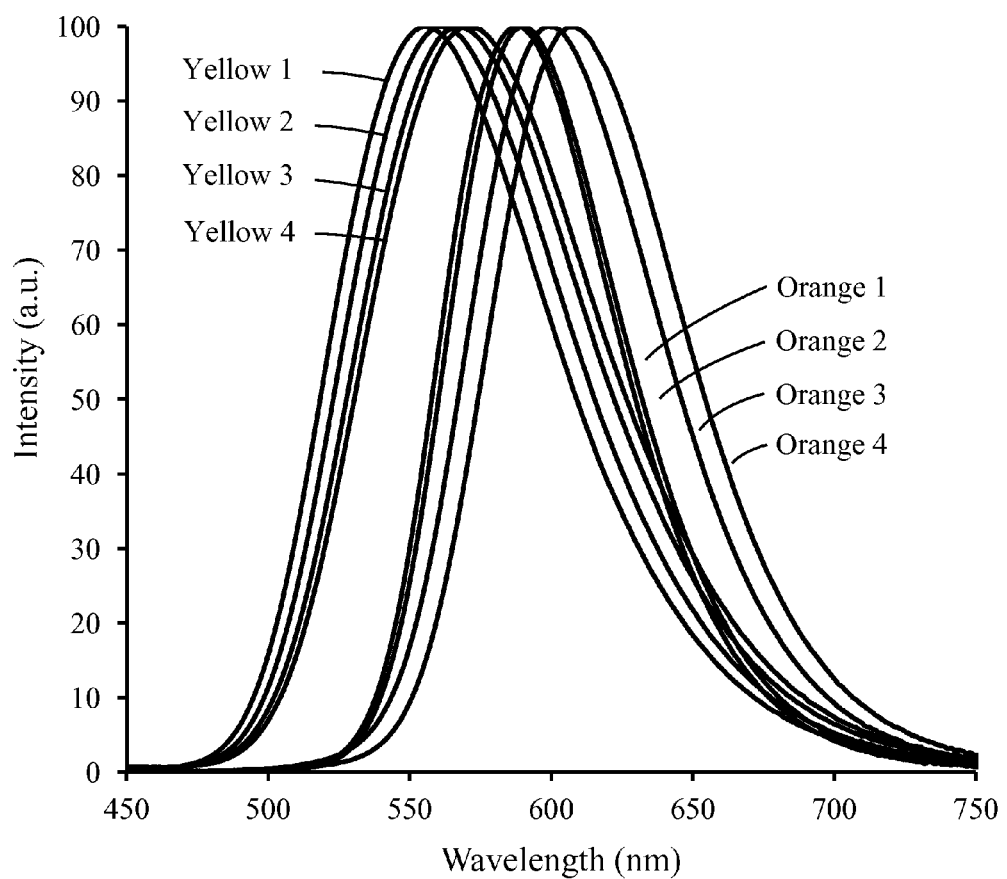
FIGS. 3A and 3B respectively show emission and excitation spectra for yellow and orange silicate phosphor materials.
Figure 3B:
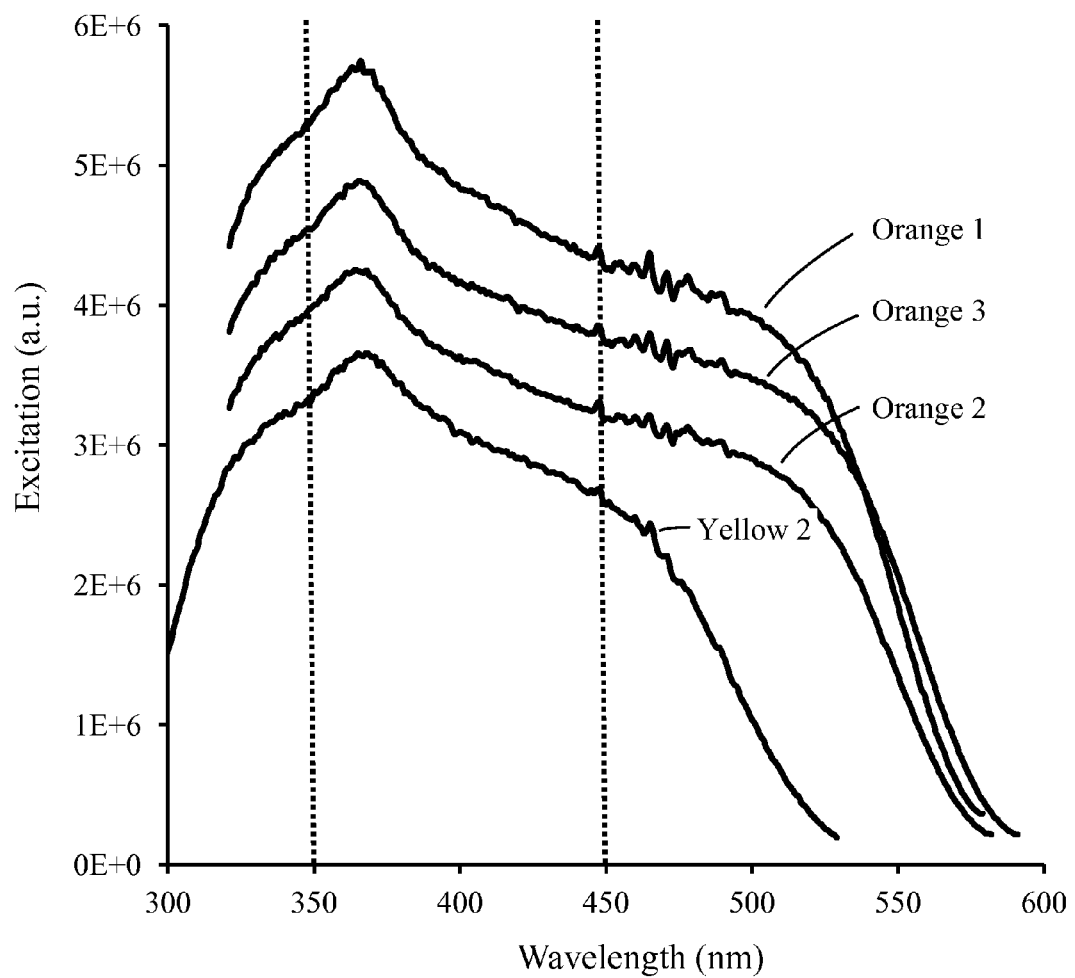

The one or more photoluminescent materials can comprise an inorganic or organic phosphor and quantum dots that is capable of generating light in the orange to red part of the spectrum. The inventors have discovered that silicate-based yellow, silicate-based orange and aluminum-silicate orange-red phosphors are preferred as they are readily excitable by light of wavelengths 350 nm to 450 nm. Examples of possible yellow silicate-based phosphors, orange silicate-based phosphors and aluminum-silicate-based orange-red phosphors are given in TABLE 1. The emission spectra for these phosphors is shown in FIG. 3A and the excitation spectra for selected phosphors from TABLE 1 shown in FIG. 3B. As can be seen from FIG. 3A whilst the phosphors are classified as yellow and orange light emitting based on their peak emission wavelengths each of the phosphors emits a significant portion of light in the orange and red parts of the spectrum (i.e. at wavelengths of 600 nm and longer).

As disclosed in U.S. Pat. No. 7,311,858 B2 "Silicate-Based Yellow-green Phosphors", the entire content of which is incorporated by way of reference, the yellow silicate-based phosphors have a general composition $A_2Si(O,D)_4$ in which Si is silicon, O is oxygen, A includes at least one of strontium (Sr), calcium (Ca), barium (Ba), magnesium (Mg), zinc (Zn) or cadmium (Cd) and D is a halogen fluorine (F), chlorine (Cl), bromine (Br), iodine (I) or phosphorous (P), sulfur (S) or nitrogen (N). Dopant D is present in the phosphor in an amount ranging from about 0.01 to 20 mole percent and it is believed that at least some of the dopant substitutes for oxygen anions to become incorporated into the crystal lattice of the phosphor. More particularly the yellow phosphor has the formula $(Sr_{1-x}Ba_xM_y)_2Si(O,D)_4:Eu^{2+}$ where $0 \leq x \leq 1$ and where $0 \leq y \leq 1$ when M is Ca; $0 \leq y \leq 1$ when M is Mg; and $0 \leq y \leq 1$ when M is Zn and Cd.

As disclosed in U.S. Pat. No. 7,655,156 B2 "Silicate-Based Orange Phosphors", the entire content of which is incorporated by way of reference, the orange silicate-based phosphors have a general composition $A_3Si(O,D)_5$ in which Si is silicon, O is oxygen, A includes at least one of strontium (Sr), barium (Ba), magnesium (Mg) or calcium (Ca) and D is a halogen chlorine (Cl), fluorine (F) or nitrogen (N) or sulfur (S). In one embodiment the silicate-based orange phosphor has the formula $(Sr_{1-x}M_x)_ySiO_5$, where M is at least one of a divalent metal Ba, Mg, Ca and/or Zn $0 \leq x \leq 0.5$; $2.6 \leq y \leq 3.3$; and $0.001 \leq z \leq 0.5$ and subject to the proviso that y is not 3 when M is Ba.

As disclosed in U.S. Pat. No. 7,648,650 B2 "Aluminum-Silicate Based Orange-Red Phosphors with Mixed Divalent and Trivalent Cations", the entire content of which is incorporated by way of reference, the aluminum-silicate based orange phosphors have a general composition $(Sr_{1-x-y}M_xT_y)_{3-m}Eu_m(Si_{1-z}Al_z)O_5$, in which M is at least one of a divalent metal Ba, Mg, and/or Ca, T is a trivalent metal Y, La, Ce, Pr, Nd, Pm, Sm, Gd, Tb, Dy, Ho, Er, Tm, Yb, Lu, Th, Pa or U; $0 \leq x \leq 0.4$; $0 \leq y \leq 0.4$; $0 \leq z \leq 0.2$; and $0.001 \leq m \leq 0.5$. Additionally such phosphors can further include a halogen such as F, Cl or Br. It is believed that such a halogen resides on oxygen lattice sites within the silicate crystal.

TABLE 1

Yellow and orange phosphor compositions, emission peak wavelength and CIE x, y

| Phosphor material | Composition | Emission Peak Wavelength (nm) | CIE x | CIE y |
|---|---|---|---|---|
| Yellow 1 | $Sr_{1.36}Ba_{0.55}Mg_{0.05}Eu_{0.10}Si_{1.03}O_4Cl_{0.18}$ | 558 | 0.423 | 0.550 |
| Yellow 2 | $Sr_{1.6}Ba_{0.35}Mg_{0.05}Eu_{0.06}Si_{1.03}O_4Cl_{0.12}$ | 565 | 0.442 | 0.534 |
| Yellow 3 | $Sr_{1.57}Ba_{0.34}Mg_{0.05}Eu_{0.10}Si_{1.03}O_4Cl_{0.18}$ | 569 | 0.459 | 0.519 |
| Yellow 4 | $Sr_{.64}Ba_{0.27}Mg_{0.05}Eu_{0.10}Si_{1.03}O_4Cl_{0.18}$ | 570 | 0.479 | 0.510 |
| Orange 1 | $Sr_3Eu_{0.06}Si_{1.02}O_5F_{0.18}$ | 586 | 0.544 | 0.449 |
| Orange 2 | $Sr_{2.94}Ba_{0.06}Eu_{0.06}Si_{1.02}O_5F_{0.18}$ | 590 | 0.553 | 0.440 |
| Orange 3 | $(Sr_{0.9}Ba_{0.1})_{2.76}Eu_{0.06}Si_{1.02}O_5F_{0.18}$ | 600 | 0.576 | 0.420 |
| Orange 4 | $(Sr_{0.87}Ba_{0.1}Y_{0.03})_{2.94}Eu_{0.06}(Si_{0.9}Al_{0.1})O_5F_{0.18}$ | 610 | 0.599 | 0.396 |

It will be appreciated that the phosphor material is not limited to the examples described and can include any suitable phosphor material, including nitride and/or sulfate phosphor materials, oxy-nitrides and oxy-sulfate phosphors or garnet materials (YAG).

Figure 4:
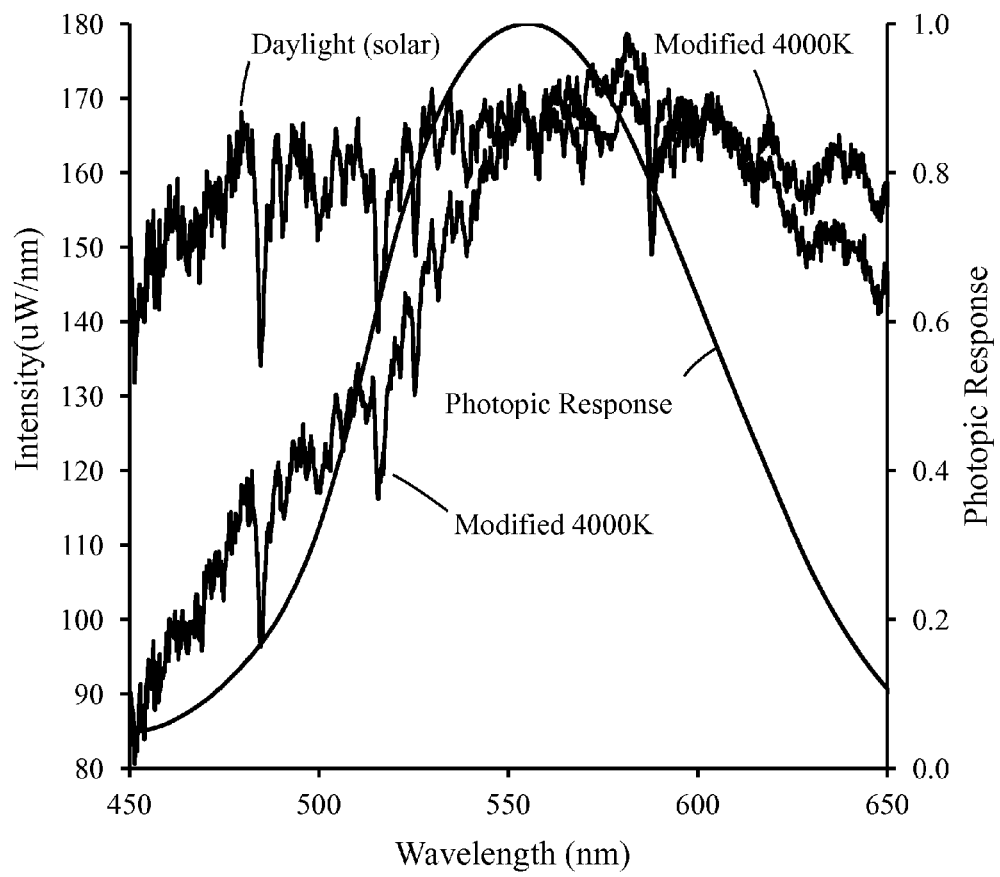
FIG. 4 illustrates the power density spectrum for 4000K modified daylight using a daylight panel in accordance with an embodiment of the invention.

In one embodiment a daylight panel for converting daylight to a color temperature of 4000K, comprises a wavelength conversion layer 140 that includes a mixture of Orange 1 and Yellow 2 phosphors (TABLE 1). The daylight color spectra, power density ($Wm^{-2} nm^{-1}$) versus wavelength (nm), for 4000K converted daylight and daylight are shown in FIG. 4 for such a panel. The photopic response of the human eye is also shown in FIG. 4. As can be seen in the figure, the modified daylight spectrum includes a high power density (portion) of orange to red light (e.g., wavelengths longer than about 600 nm) compared with the unconverted daylight in a warm daylight product.

Figure 5:
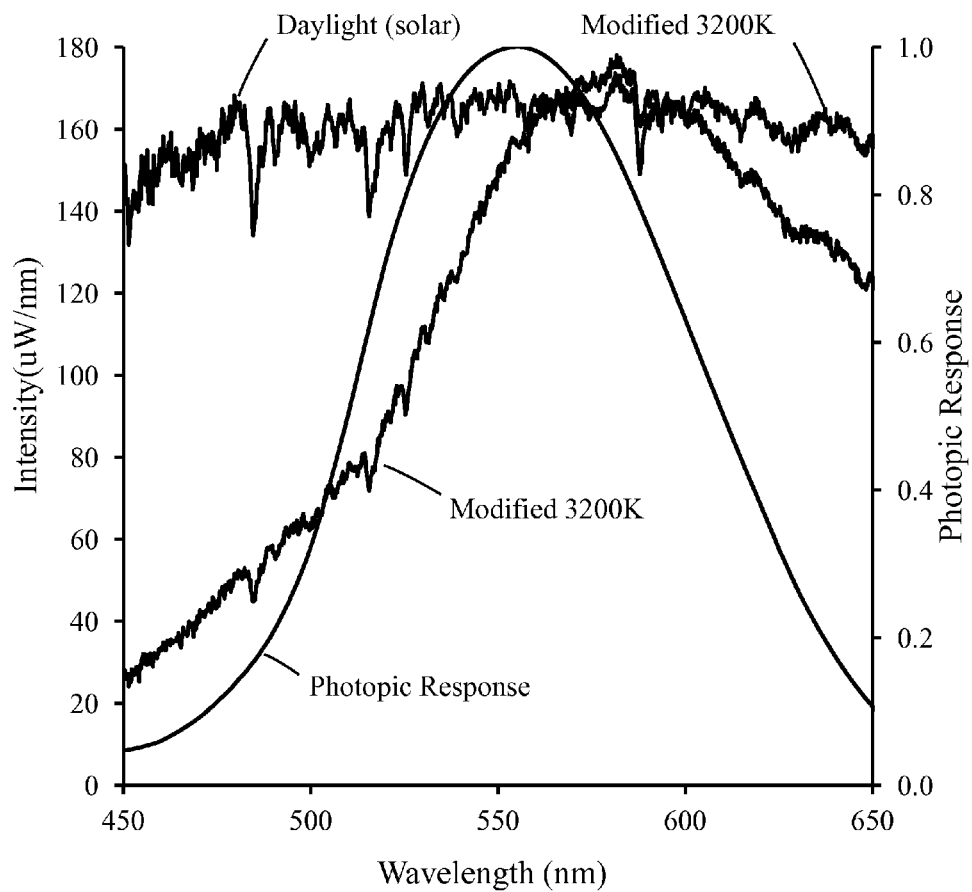
FIG. 5 illustrates the power density spectrum for 3200K modified daylight using a daylight panel in accordance with an embodiment of the invention.

In another embodiment a daylight panel for converting daylight to a color temperature of 3200K, comprises a wavelength conversion layer 140 that includes the Orange 1 phosphor (TABLE 1). The daylight color spectra, power density (Wm$^{-2}$ nm$^{-1}$) versus wavelength (nm), for 3200K converted daylight and daylight are shown in FIG. 5 for such a panel. The photopic response of the human eye is also shown in FIG. 5. As can be seen in the figure, the modified daylight spectrum includes a high power density (portion) of orange to red light (e.g., wavelengths longer than about 600 nm) compared with the unconverted daylight resulting in a warmer light product.

Figure 6:
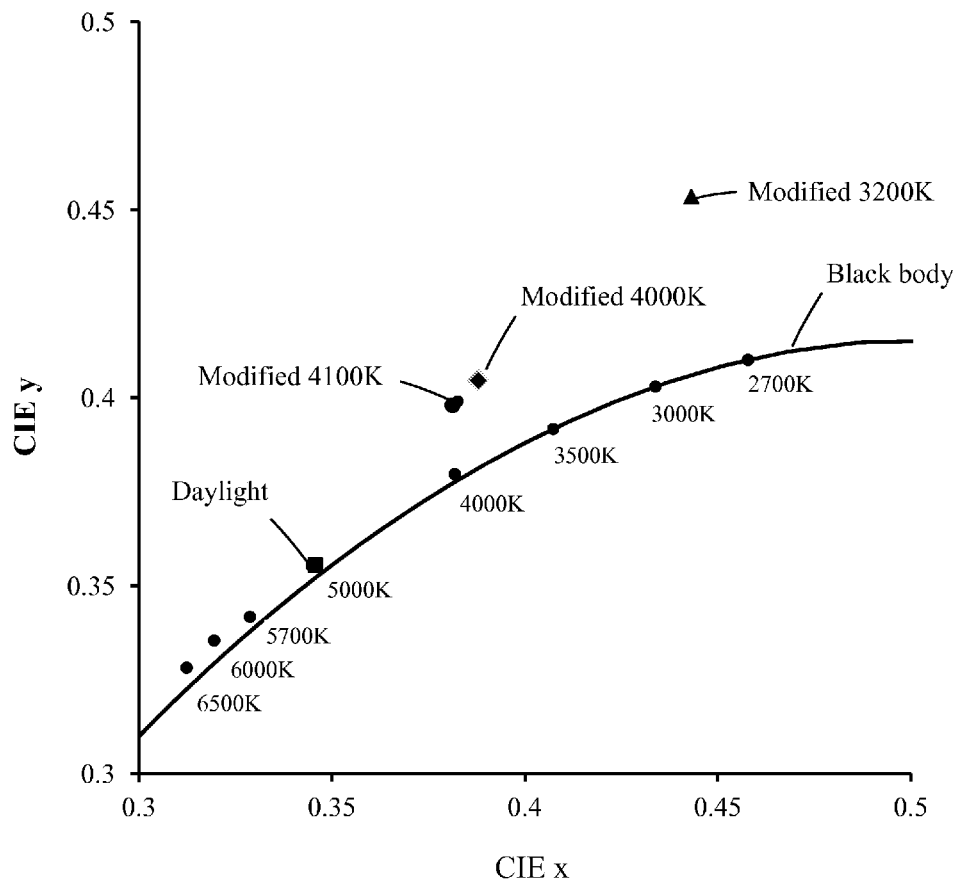
FIG. 6 is a chromaticity diagram illustrating daylight, 4000K modified daylight and 3200K modified daylight.

In other embodiments the wavelength conversion layer advantageously includes the Orange 2 phosphor (TABLE 1). Such a phosphor is found to be particularly suited for converting daylight to color temperatures of 2700K to 3500K. FIG. 6 is a portion of the CIE diagram showing daylight, modified 3200K, 4000K and 4100K daylight and their relationship to the black body curve. By appropriate selection of the phosphor material it is possible to generate a converted daylight spectrum that lies within less than three MacAdam ellipses of the black body curve.

While the wavelength conversion layer has been described as comprising photoluminescent material in the form of phosphors, the invention is applicable to any type of photoluminescent material, such as quantum dots. For example, the photoluminescent material can comprise quantum dots, such as for example, cadmium selenide (CdSe). The color of light generated by a quantum dot is enabled by the quantum confinement effect associated with the nano-crystal structure of the quantum dots. The energy level of each quantum dot relates to the size of the quantum dot. The larger quantum dots, such as red quantum dots, can absorb and emit photons having a relatively lower energy (e.g. a relatively longer wavelength). On the other hand, orange quantum dots which are smaller in size can absorb and emit photons of a relatively higher energy (shorter wavelength). Additionally, daylight panels are envisioned that use cadmium free quantum dots and rare earth (RE) doped oxide colloidal phosphor nanoparticles, in order to avoid the toxicity of the cadmium in the quantum dots.

Examples of suitable quantum dots include: CdZnSeS (cadmium zinc selenium sulfide), $Cd_xZn_{1-x}Se$ (cadmium zinc selenide), $CdSe_xS_{1-x}$ (cadmium selenium sulfide), CdTe (cadmium telluride), $CdTe_xS_{1-x}$ (cadmium tellurium sulfide), InP (indium phosphide), $In_xGa_{1-x}P$ (indium gallium phosphide), InAs (indium arsenide), $CuInS_2$ (copper indium sulfide), $CuInSe_2$ (copper indium selenide), $CuInS_xSe_{2-x}$ (copper indium sulfur selenide), $Cu In_xGa_{1-x}S_2$ (copper indium gallium sulfide), $CuIn_xGa_{1-x}Se_2$ (copper indium gallium selenide), $CuIn_xAl_{1-x}Se_e$ (copper indium aluminum selenide), $CuGaS_2$ (copper gallium sulfide) and $CuInS_{2x}ZnS_{1-x}$ (copper indium selenium zinc selenide).

The quantum dots material can comprise core/shell nano-crystals containing different materials in an onion-like structure. For example, the above described exemplary materials can be used as the core materials for the core/shell nano-crystals.

The optical properties of the core nano-crystals in one material can be altered by growing an epitaxial-type shell of another material. Depending on the requirements, the core/shell nano-crystals can have a single shell or multiple shells. The shell materials can be chosen based on the band gap engineering. For example, the shell materials can have a band gap larger than the core materials so that the shell of the nano-crystals can separate the surface of the optically active core from its surrounding medium.

In the case of the cadmium-based quantum dots, e.g., CdSe quantum dots, the core/shell quantum dots can be synthesized using the formula of CdSe/ZnS, CdSe/CdS, CdSe/ZnSe, CdSe/CdS/ZnS, or CdSe/ZnSe/ZnS. Similarly, for $CuInS_2$ quantum dots, the core/shell nano-crystals can be synthesized using the formula of $CuInS_2$/ZnS, $CuInS_2$/CdS, $CuInS_2$/$CuGaS_2$, $CuInS_2$/$CuGaS_2$/ZnS and so on.

Additionally, while FIG. 2 describes a daylight panel that includes a wavelength conversion layer on a light transmissive substrate, other embodiments of a daylight panel wherein photoluminescent material (e.g., phosphors or quantum dots) is distributed within a light transmissive material can be utilized as well. In such embodiments, the photoluminescent material may be selectively distributed, patterned, uniformly distributed, and/or non-uniformly distributed within the light transmissive substrate.

In addition to CCT, another property of light that may be improved with the daylight panel 100 is the amount of lumens associated with the emission product 120 of the daylight panel 100. Lumens are a measurement of human eye sensitivity to a specific color. Blue, violet, and UV light contribute a small amount of lumens to a light product because the eye is less sensitive to shorter wavelengths, while orange and red light contribute larger amounts of lumens to a light product because the eye is more sensitive to these longer wavelengths. By converting shorter wavelengths of daylight (e.g., blue, violet, UV) into longer wavelengths (e.g., orange and red) using the daylight panel 100, more lumens can be generated for the emission product 120 without sacrificing visible portions of the blue spectrum.

Figure 7A:
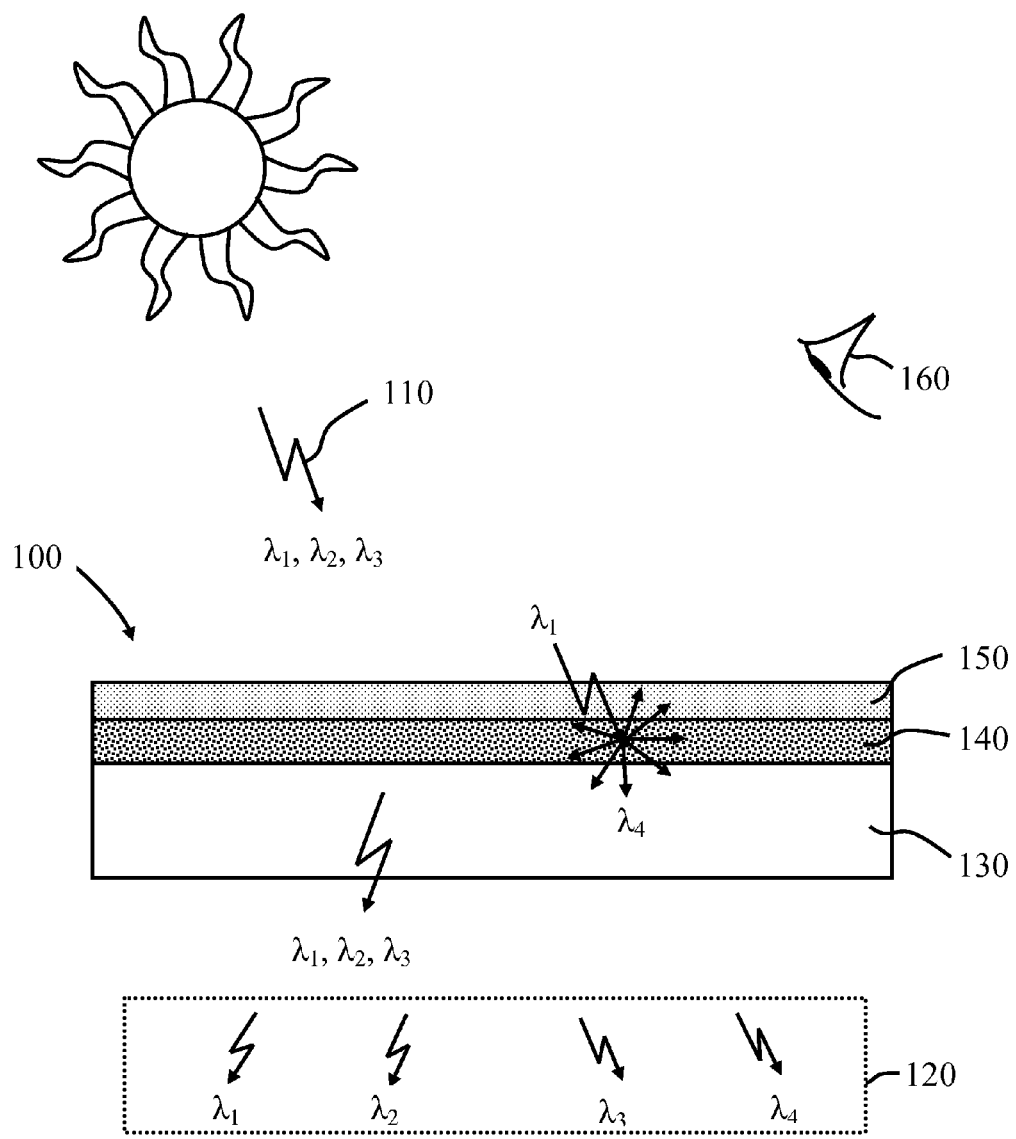
FIGS. 7A-7C are schematic diagrams of daylight panels in accordance with embodiments of the invention.

FIG. 7A illustrates a daylight panel 100 in accordance with another embodiment of the invention. The daylight panel 100 includes a light transmissive substrate 130, a light diffusing layer 150, and a wavelength conversion layer 140. The light transmissive substrate 130 and the wavelength conversion layer 140 are the same as the light transmissive substrate and the wavelength conversion layer described above with respect to FIG. 2.

The light diffusing layer 150 includes a uniform thickness layer of particles of a light reflective material, such as titanium dioxide ($TiO_2$). In alternative arrangements the light reflective material can include barium sulfate ($BaSO_4$), magnesium oxide (MgO), silicon dioxide ($SiO_2$), aluminum oxide ($Al_2O_3$) or a powdered material with as high a reflectivity as possible, typically a reflectance of 0.9 or higher. Any other suitable light reflective material may be used if desired. The light reflective material powder is thoroughly mixed in known proportions with a light transmissive binder material to form a suspension. For aesthetic considerations, the light diffusive material is typically white in color. In FIG. 7A, the resulting mixture is deposited onto the face of the wavelength conversion layer 140. The diffusing layer 150 can be deposited by screen printing, although other deposition techniques such as slot die coating, spin coating or doctor blading can be used. The diffusing layer 150 is then cured to form the daylight panel 100.

The daylight panel 100 is configured such that the diffusing layer 150 is closest to the incident daylight 120, with the wavelength conversion layer 140 being sandwiched between the diffusing layer 150 and the light transmissive substrate 130.

The diffusing layer 150 improves the visual appearance of the daylight panel 100 to an observer 160 looking at a surface of the diffusing layer 150 (i.e. an observer on the outside of the panel) because the light reflective material making up the diffusing layer 150 appears white to the observer. Moreover, the diffusing layer 150 also reduces the effects of shadows associated with the angle of incident daylight.

Figure 7B:
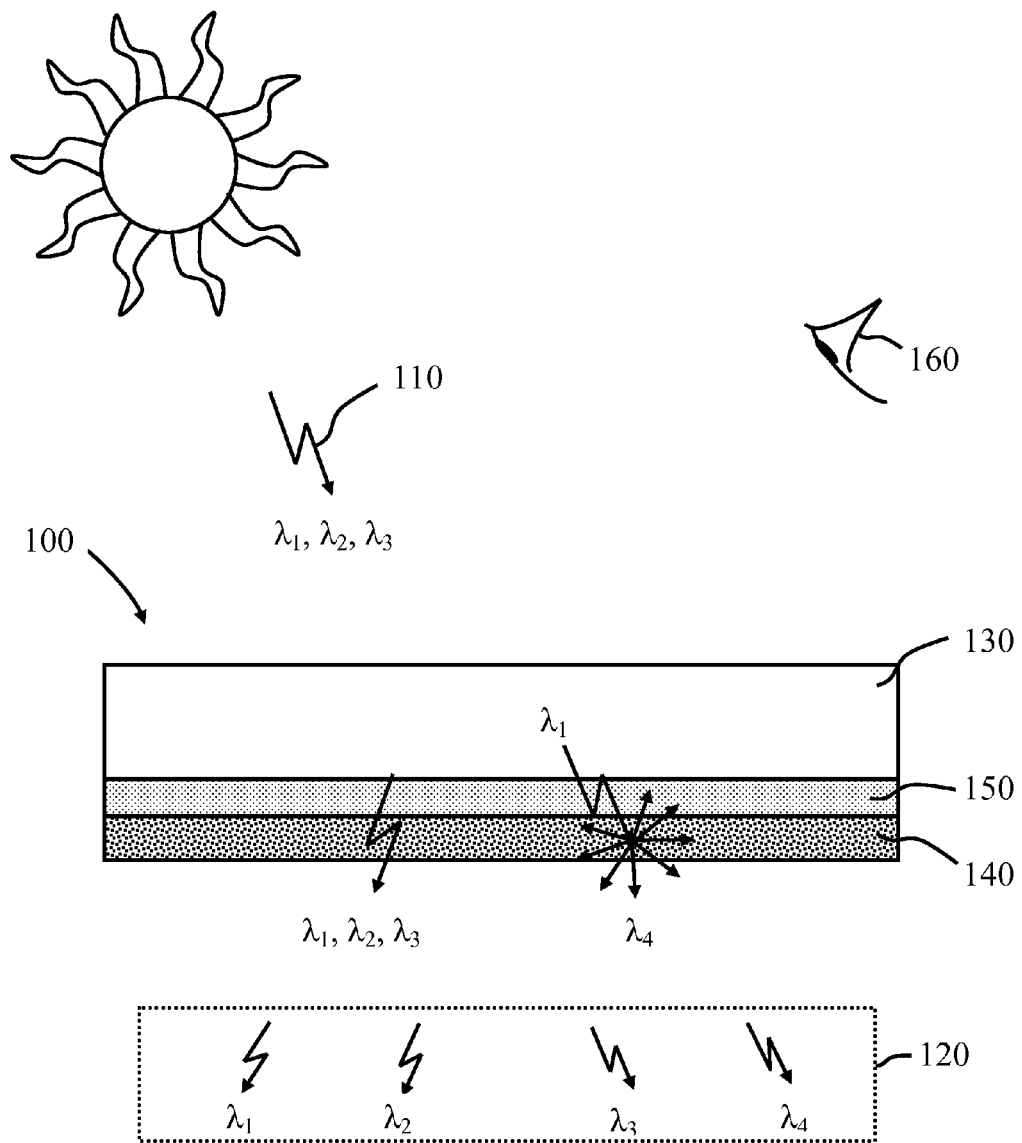

FIG. 7B illustrates a daylight panel 100 in accordance with another embodiment of the invention. The daylight panel 100 operates substantially the same as the daylight panel 100 of FIG. 7A. However, in FIG. 7B the diffusing layer 150 is deposited onto the face of the light transmissive substrate 130 rather than the wavelength conversion layer 140. The wavelength conversion layer 140 is then deposited onto the face of the diffusing layer 150 in the same manner as described above to form the daylight panel 100. Thus, the daylight panel 100 of FIG. 7B is configured such that the light transmissive substrate 130 is closest to the incident daylight 120, with the diffusing layer 150 being sandwiched between the light transmissive substrate 130 and the wavelength conversion layer 140.

In this embodiment the diffusing layer 150 improves the visual appearance of the daylight panel 100 to an observer looking at a surface of the light transmissive substrate because the light reflective material making up the diffusing layer 150 appears white in color to an observer 160, which reduces the yellow appearance of the phosphor material (or generally any colors from the phosphor material) within the wavelength conversion layer. Moreover, the diffusing layer 150 of the daylight panel 100 in FIG. 7B also reduces the effects of shadows associated with the angle of incident daylight 120.

Figure 7C:
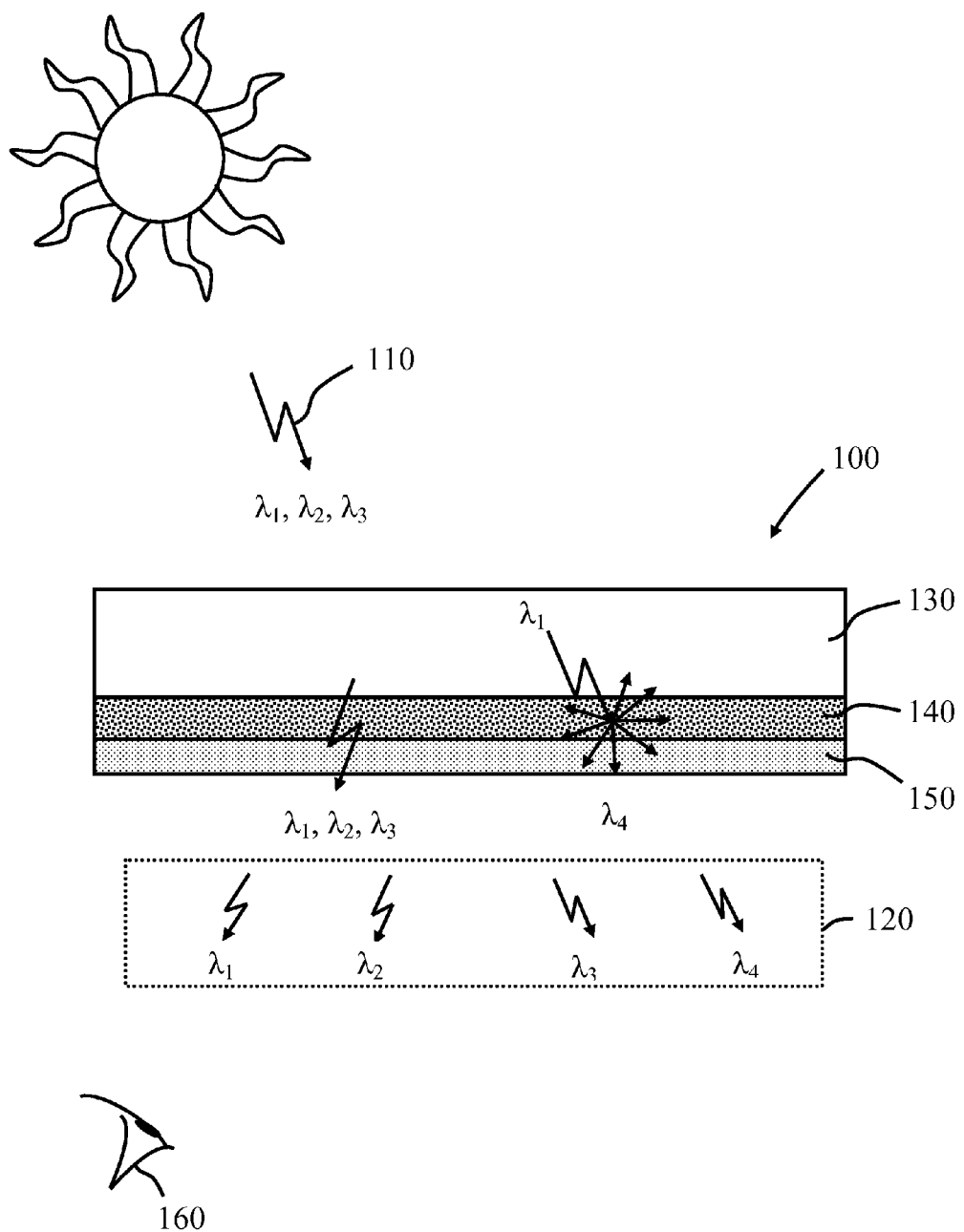

FIG. 7C illustrates a daylight panel 100 in accordance with another embodiment of the invention. The daylight panel 100 operates substantially the same as the daylight panel of FIG. 7A. However, the daylight panel 100 is configured such that the diffusing layer 150 is closest to observer 160 on the underside of the daylight panel with the wavelength conversion layer 140 being sandwiched between the light transmissive substrate 130 and the diffusing layer 150.

The diffusing layer 150 improves the visual appearance of the daylight panel 100 to an observer looking at a surface of the diffusing layer because the light reflective material making up the diffusing layer 150 appears white to the observer 160.

Whilst FIGS. 7A-7C describe daylight panels 100 that include a wavelength conversion layer 140, a diffusing layer 150, and a light transmissive substrate 130, other embodiments may include a diffusing layer situated on a layer of photoluminescent material (e.g., phosphors or quantum dots) that is distributed within a light transmissive material.

Figure 8A:
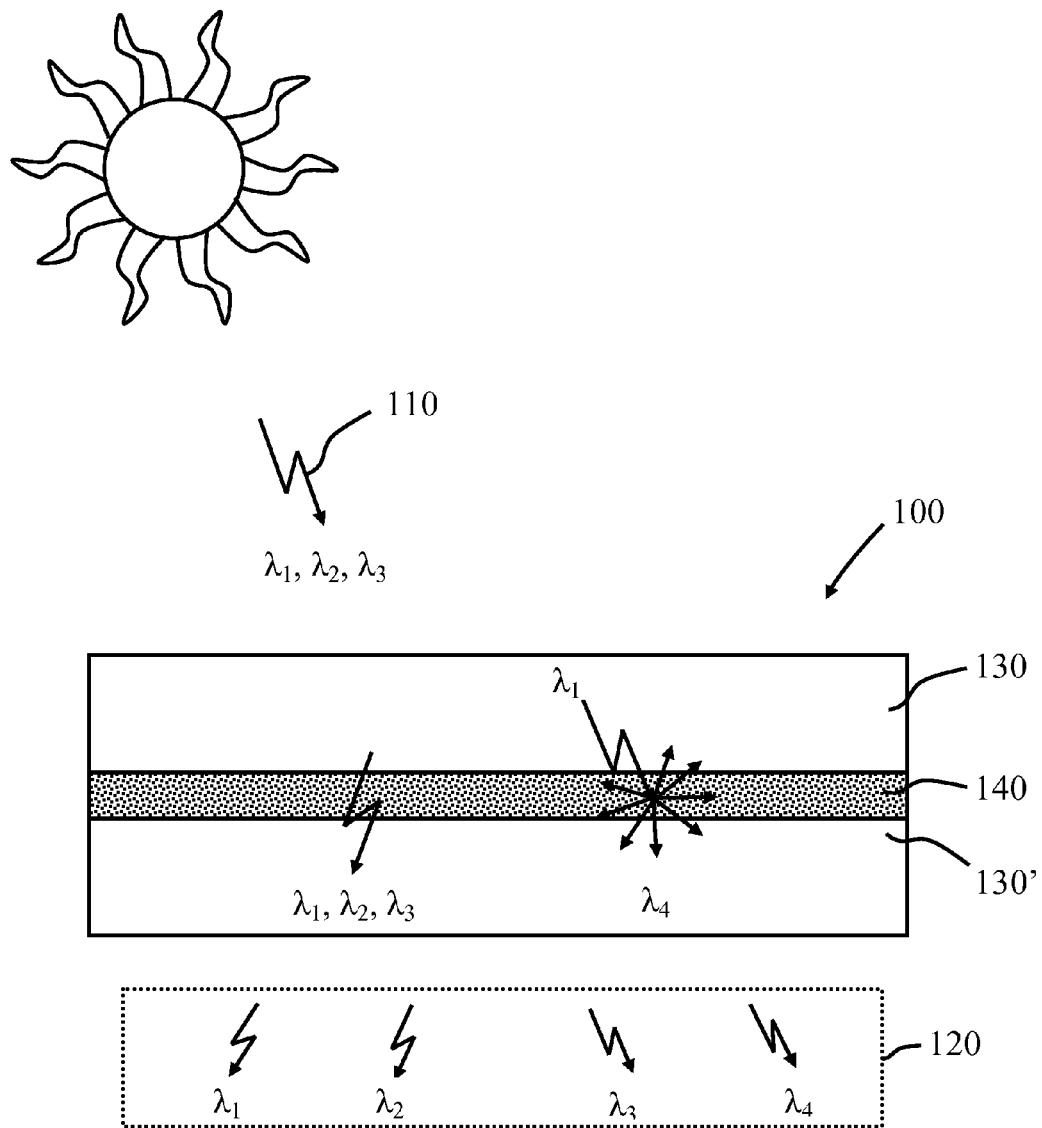
FIGS. 8A and 8B are schematic diagrams of daylight panels in accordance with embodiments of the invention.
Figure 8B:
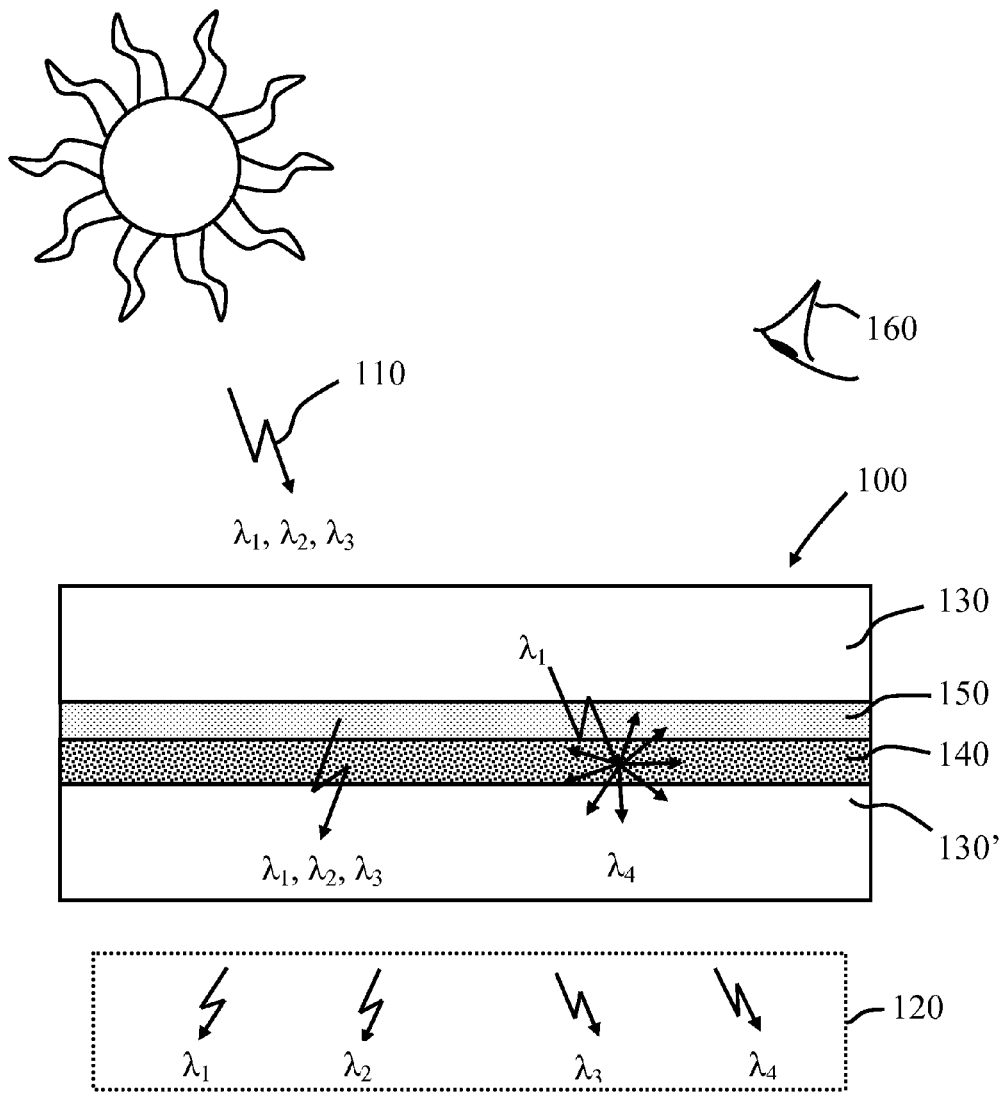

FIGS. 8A and 8B illustrate daylight panels in accordance with alternative embodiments of the invention.

The daylight panel 100 of FIG. 8A is similar to the daylight panel of FIG. 2, with the addition of another light transmissive substrate 130'. Additionally, the light transmissive substrates 130, 130' are preferably, but need not be, hermetic. For hermetic substrates 130, 130', the wavelength conversion layer 140 is located between the first light transmissive hermetic substrate 130 and the second light transmissive hermetic substrate 130'. The first light transmissive hermetic substrate 130 and the second light transmissive hermetic substrate 130' respectively provide a barrier to a first surface of the wavelength conversion layer 140 and a second surface of the wavelength conversion layer 140. The surfaces of the wavelength conversion layer 140 may be in direct contact with the light transmissive hermetic substrates 130, 130', as depicted in FIG. 8A. The term "direct contact" for this embodiment means that there are substantially no intervening layers or air gaps. Creating direct contact at the interface between the wavelength conversion layer 140 and either light transmissive hermetic substrate 130, 130' may be preferred to safeguard against non-ideal behavior of light transmitting through the daylight panel 100. Furthermore, a light transmissive hermetic substrate 130, 130' in direct contact with a surface of the wavelength conversion layer 140 creates a barrier against environmental contaminants, such as moisture that may affect the performance of the phosphor.

The daylight panel 100 of FIG. 8B is similar to the daylight panels of FIGS. 7A and 7B, with the addition of another light transmissive substrate 130'. The light transmissive substrates 130, 130' are preferably, but need not be hermetic. For hermetic substrates 130, 130', the wavelength conversion layer 140 and diffusing layer 150 are located between the first light transmissive hermetic substrate 130 and the second light transmissive hermetic substrate 130'. The first light transmissive hermetic substrate 130 and the second light transmissive hermetic substrate 130' respectively provide a barrier to a first surface of the wavelength conversion layer 140 and a first surface of the diffusing layer 150. The surfaces of the wavelength conversion layer 140 and diffusing layer 150 may be in direct contact with the light transmissive hermetic substrates 130, 130', as depicted in FIG. 8B. The term "direct contact" in this context means that there are substantially no intervening layers or air gaps. Creating direct contact at the interface between the wavelength conversion layer 140 or diffusing layer 150 and either light transmissive hermetic substrate 130, 130' may be preferred in order to safeguard against non-ideal behavior of light transmitting through the daylight panel 100. Furthermore, a light transmissive hermetic substrate 130, 130' in direct contact with a surface of the wavelength conversion layer 140 or diffusing layer 150 creates a barrier against environmental contaminants.

Figure 9A:
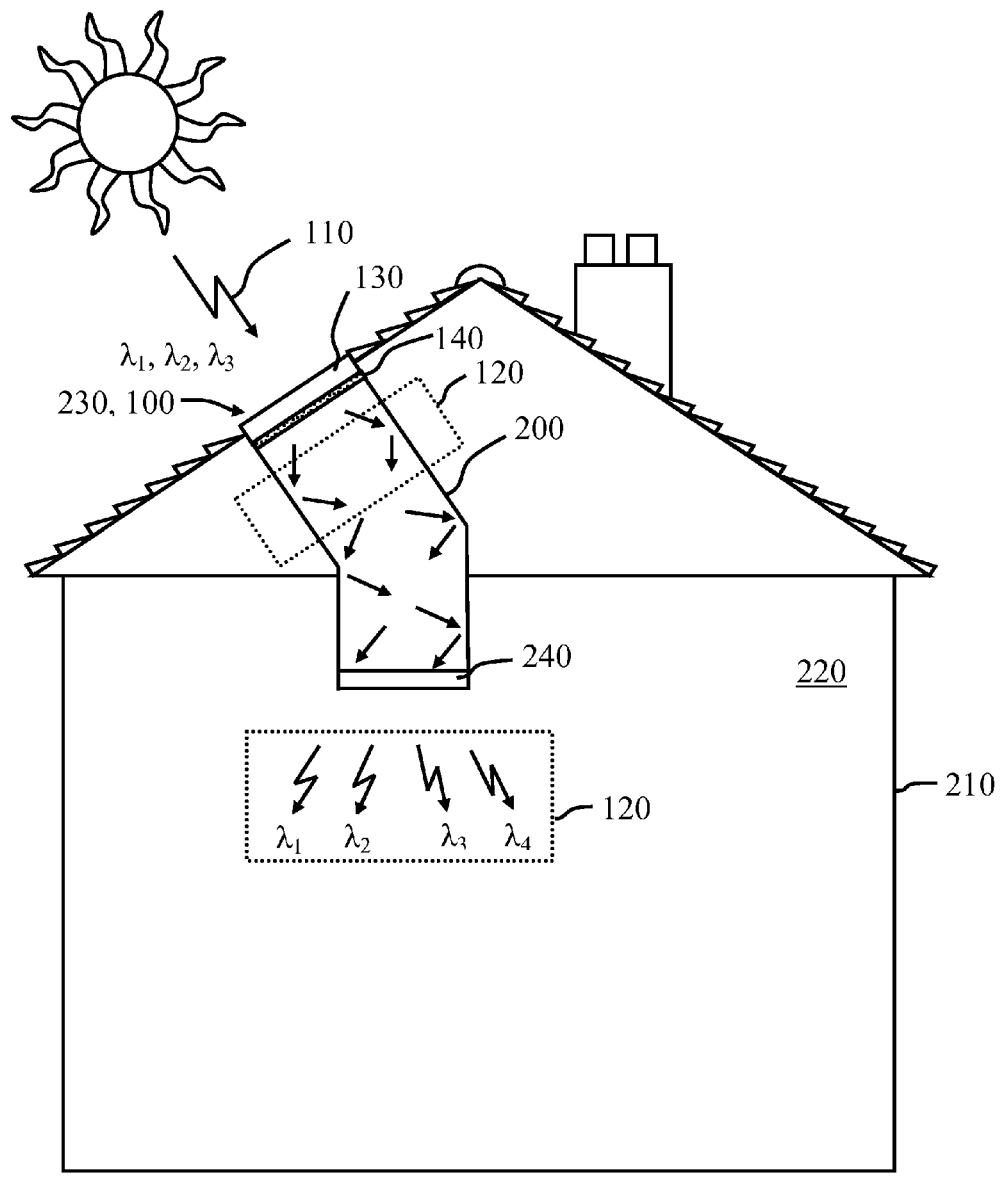
FIGS. 9A-9C are schematic diagrams illustrating light tubes in accordance with embodiments of the invention.

FIG. 9A illustrates a light tube 200 in accordance with some embodiments of the invention. The light tube 200 may be used in conjunction with any of the daylight panels described above, e.g., with respect to FIGS. 2, 7A-7C, 8A and 8B.

The light tube 200 is a tube or pipe that transports light from one location to another. The light tube 200 may be implemented in a structure 210 (e.g., residential, commercial or industrial property) for transporting daylight to an interior 220 of the structure and includes a first surface 230 for receiving daylight 110 and a second surface 240 for emitting modified daylight emission product 120 into the interior 220 of the structure 210. In the embodiment illustrated in this figure, the first surface 230 includes a daylight panel, such as those described above with respect to FIGS. 2, 7A-7C, and 8A and 8B and the second surface 240 comprises a light transmissive substrate (window). While the first surface 230 is depicted in FIG. 9A as having a planar shape, it may also have a dome shape to improve the light tube's 200 ability to receive (capture) incident daylight 110. Daylight 110 incident on the first surface 230 generates a modified daylight emission product 120 that includes the combination of wavelengths $\lambda_1, \lambda_2, \lambda_3$ of daylight transmitted by the daylight panel 100 and the wavelengths $\lambda_4$ of light generated by the photoluminescent material of the daylight panel 100 as described above with respect to FIGS. 2, 7A-7C, 8A and 8B. The surface of the daylight panel facing the daylight may be the light transmissive substrate 130, the wavelength conversion layer 140, or the diffusing layer 150 depending on the embodiment of the daylight panel used. The light tube 200 may be substantially hollow, and/or may be filled in part with a waveguide material.

The modified daylight emission product 120 is transported along the light tube 200 through the second surface 240 (i.e. light transmissive substrate) to illuminate the interior 220 of the structure 210. Typically the inner surface of the light tube 200 is highly reflective to facilitate the efficient transport of the modified daylight emission product 120 from the first surface 230 to the second surface 230. Additionally, the light tube 200 may be angled or flexible to facilitate the transport of the emission product 120 from the first surface 230 to the second surface 240. The light tube 200 may have any suitable shape and may be fabricated form any suitable material. Moreover, the light tube 200 may be implemented with a daylight panel that utilizes a uniform distribution of the one or more phosphor materials or a selective distribution or patterning of the one or more phosphor materials depending on the application. The second surface 240 may be located at one end of the light tube 200, as shown in FIG. 9A, or may be located at any other suitable location along the length of the light tube 200. As another example, the second surface 240 may be a volume that fills the light tube 200, in whole or in part. Additionally, the second surface 240 may include a light diffusing layer to improve the visual appearance of the second surface 240 to an observer facing the second surface 240.

Figure 9B:
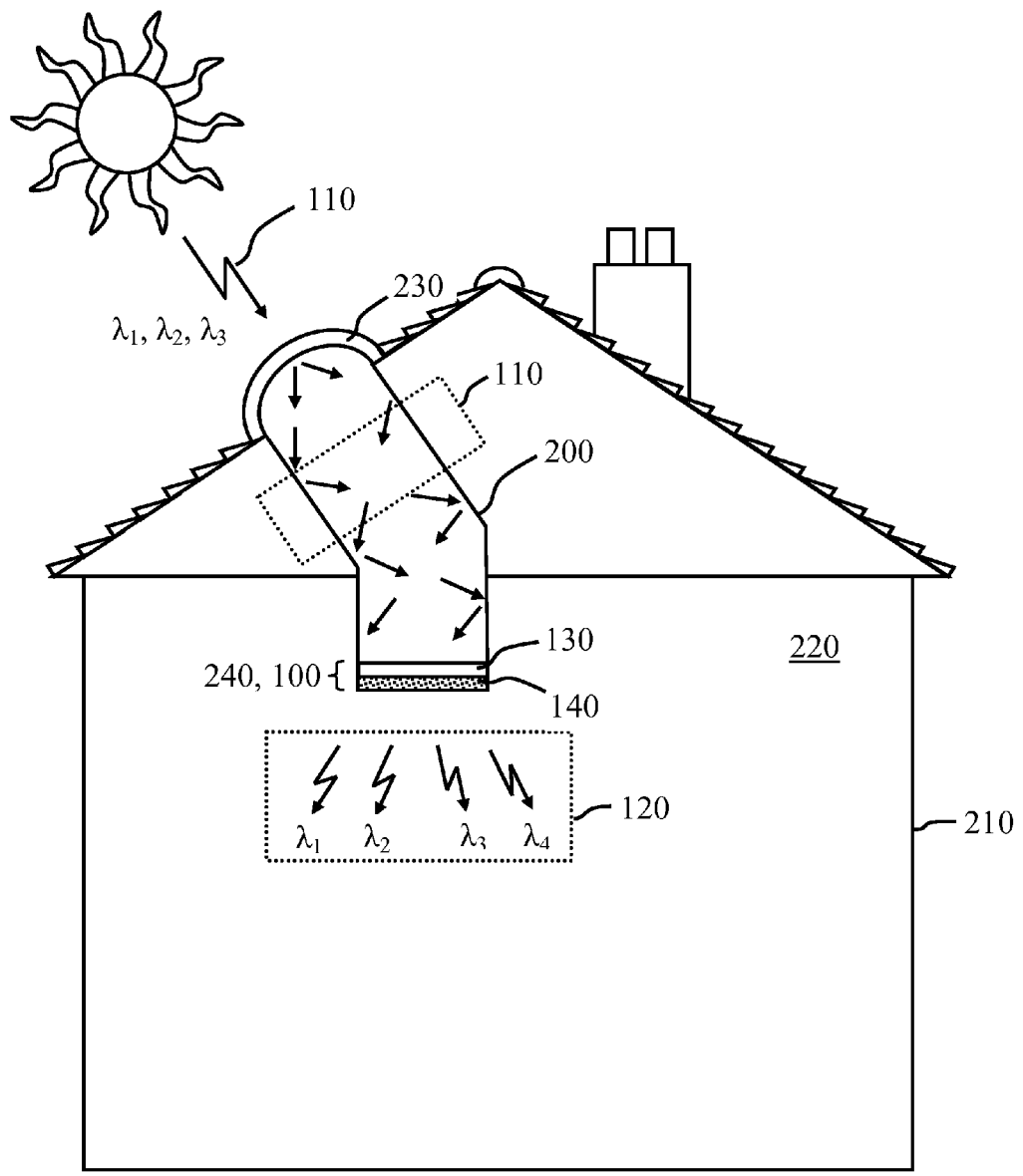

FIG. 9B illustrates a light tube 200 in accordance with some other embodiments of the invention. The light tube 200 may be used in conjunction with any of the daylight panels 100 described above with respect to FIGS. 2, 7A-7C, 8A and 8B.

As mentioned above, the light tube 200 is a tube or pipe that transports light from one location to another and may be implemented in a structure 210 (e.g., residential, commercial or industrial property) for transporting daylight to the interior 220 of the structure. The light tube 200 in FIG. 9B includes a first light receiving surface 230 and a second light emitting surface 240, wherein the first surface 230 comprises a light transmissive substrate and the second surface 240 includes a daylight panel 100, such as those described above with respect to FIGS. 2, 7A-7C, 8A and 8B. As illustrated in FIG. 9B, the first light receiving surface 230 may have a dome shape to improve the light tube's 200 ability to receive (capture) incident daylight 110. Daylight 110 incident on the first surface 230 is transported along the light tube 200 to the second surface 240. At the second surface 240, the daylight panel 100 generates an emission product 120 that includes the combination of wavelengths $\lambda_1$, $\lambda_2$, $\lambda_3$ transmitted by the daylight panel 100 and the wavelengths $\lambda_4$ of light generated by the photoluminescent material of the daylight panel 100 as described above with respect to FIGS. 2, 7A-7C, and 8A-8B. The modified daylight emission product 120 is used to illuminate the interior 210 of the structure 220. Typically the inner surface of the light tube 200 is highly reflective to ensure the efficient transport of daylight 110 from the first surface 230 to the second surface 230. Additionally, the light tube 200 may be angled or flexible. The light tube 200 may have any suitable shape and may be fabricated from any suitable material. Moreover, the light tube 200 may be implemented with a daylight panel that utilizes a uniform distribution of the one or more phosphor materials or a selective distribution or patterning of the one or more phosphor materials depending on the application. In some embodiments, the second surface 240 may include a diffusing layer to improve the visual appearance of the surface to an observer as well as reduce the effect of shadows from the angle of incident daylight. The light tube 200 may be substantially hollow, and/or may be filled in part with a waveguide material.

Figure 9C:
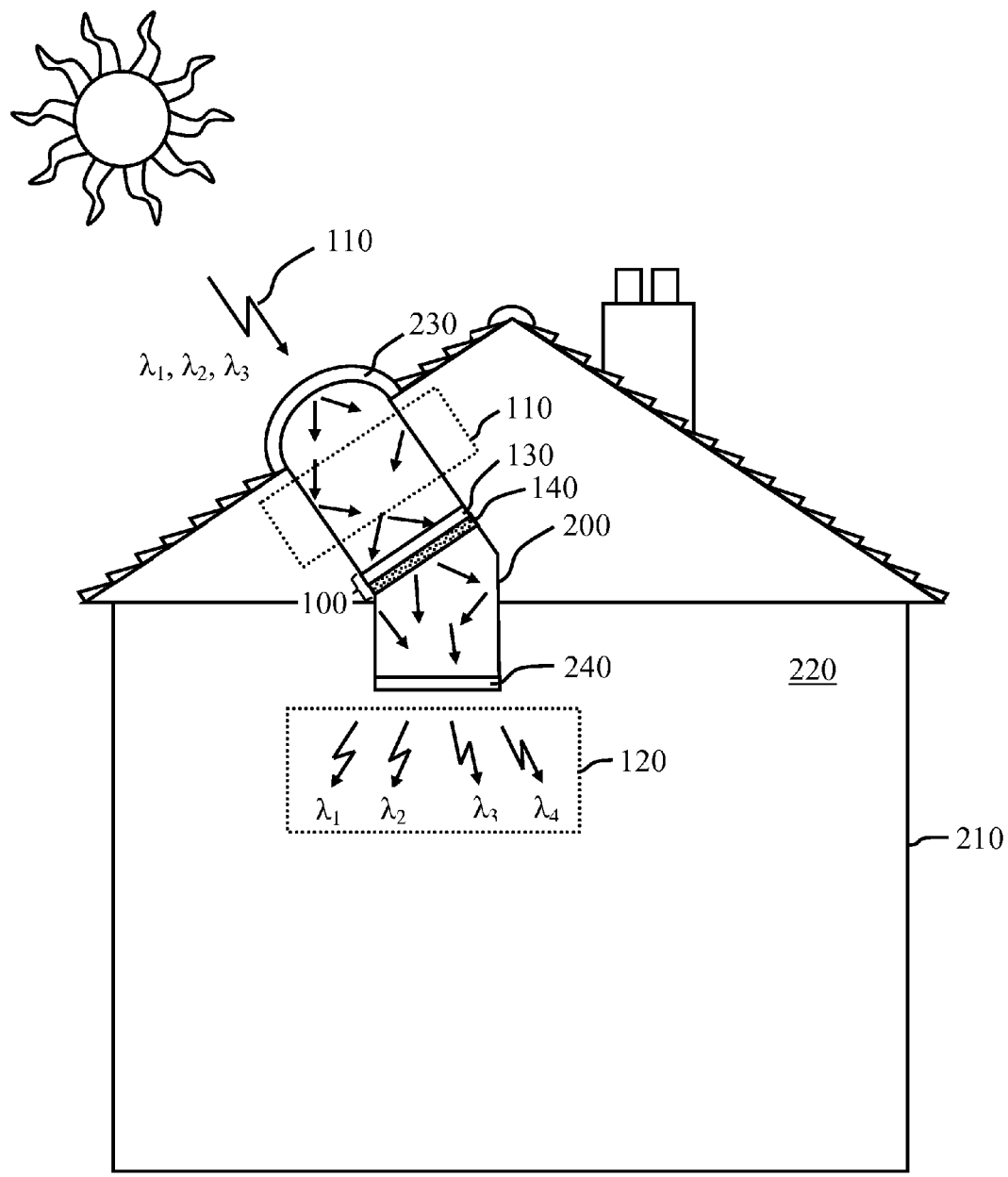

FIG. 9C illustrates a light tube 200 in accordance with some other embodiments of the invention. The light tube 200 may be used in conjunction with any of the daylight panels described above with respect to FIGS. 2, 7A-7C, 8A and 8B.

As mentioned above, the light tube 200 is a tube or pipe that transports light from one location to another and may be implemented in a residential or commercial property 210 for transporting daylight to an interior 220 of the residential/commercial environment. The light tube 200 includes a first surface 230 for receiving incident daylight, a second surface 240 for emitting modified daylight 120 into the interior of the structure 210 and a daylight panel 100, such as those described above with respect to FIGS. 2, 7A-7C, 8A and 8B. While the first surface 230 in FIG. 9C is depicted as having a dome shape, it may alternatively have a planar shape or other shape to optimize the light tube's 200 ability to capture incident daylight 110. In this embodiment the daylight panel 100 is positioned within the light tube 200 between the first and second surfaces 230, 240. Daylight 110 incident on the first surface 230 is transported along the light tube 200 to the daylight panel 100. At the daylight panel 100, a modified daylight emission product 120 is generated that includes the combination of wavelengths $\lambda_1$, $\lambda_2$, $\lambda_3$ transmitted by the daylight panel 100 and the wavelengths $\lambda_4$ of light generated by the photoluminescent material within the daylight panel 100 as described above with respect to FIGS. 2, 7A-7C, and 8A-8B. The modified daylight emission product 120 is transported along the light tube 200 through the second surface 240, where it is used to illuminate the interior 220 of the structure 210. Typically the inner surface of the light tube 200 is highly reflective to ensure the efficient transport of light from the first surface 230 to the second surface 230. Additionally, the light tube 200 may be angled or flexible and may be fabricated from any suitable material. Moreover, the light tube 200 may be implemented with a daylight panel 100 that utilizes a uniform distribution of the one or more phosphor materials or a selective distribution or patterning of the one or more phosphor materials depending on the application. The second surface 240 may be located at one end of the light tube 200, as indicated in FIG. 9C, or may be located at any other suitable location along the length of the light tube 200. As another example, the second surface 240 may be a volume that fills the light tube 200, in whole or in part. The light tube 200 may be substantially hollow, and/or may be filled in part with an optical medium.

By configuring the photoluminescent material of the daylight panel with different combinations and distributions of the one or more phosphor materials, a modified daylight emission product 120 can have a spectrum with a higher power density of orange and red light and a lower power density of violet to blue light (e.g., a more uniform color spectrum), which results in a "warm white" or "warmer white" CCT that is more preferable for use in offices and homes. Also, as mentioned above, by converting shorter wavelengths of daylight (e.g., blue, violet, UV) into longer wavelengths (e.g., orange and red) using the daylight panel, more lumens can be generated for the emission product 120 without sacrificing visible portions of the blue spectrum.

While the above embodiments of light tubes in FIGS. 9A, 9B, and 9C describe the daylight panel as being implemented as a part of the first surface, as a part of the second surface, or located between the first and second surfaces, the daylight panel can comprise a part of the inner light reflective surface of the light tube. In the latter it is envisioned to provide the conversion layer directly to at least a part of the inner surface of the light tube.

Figure 10:
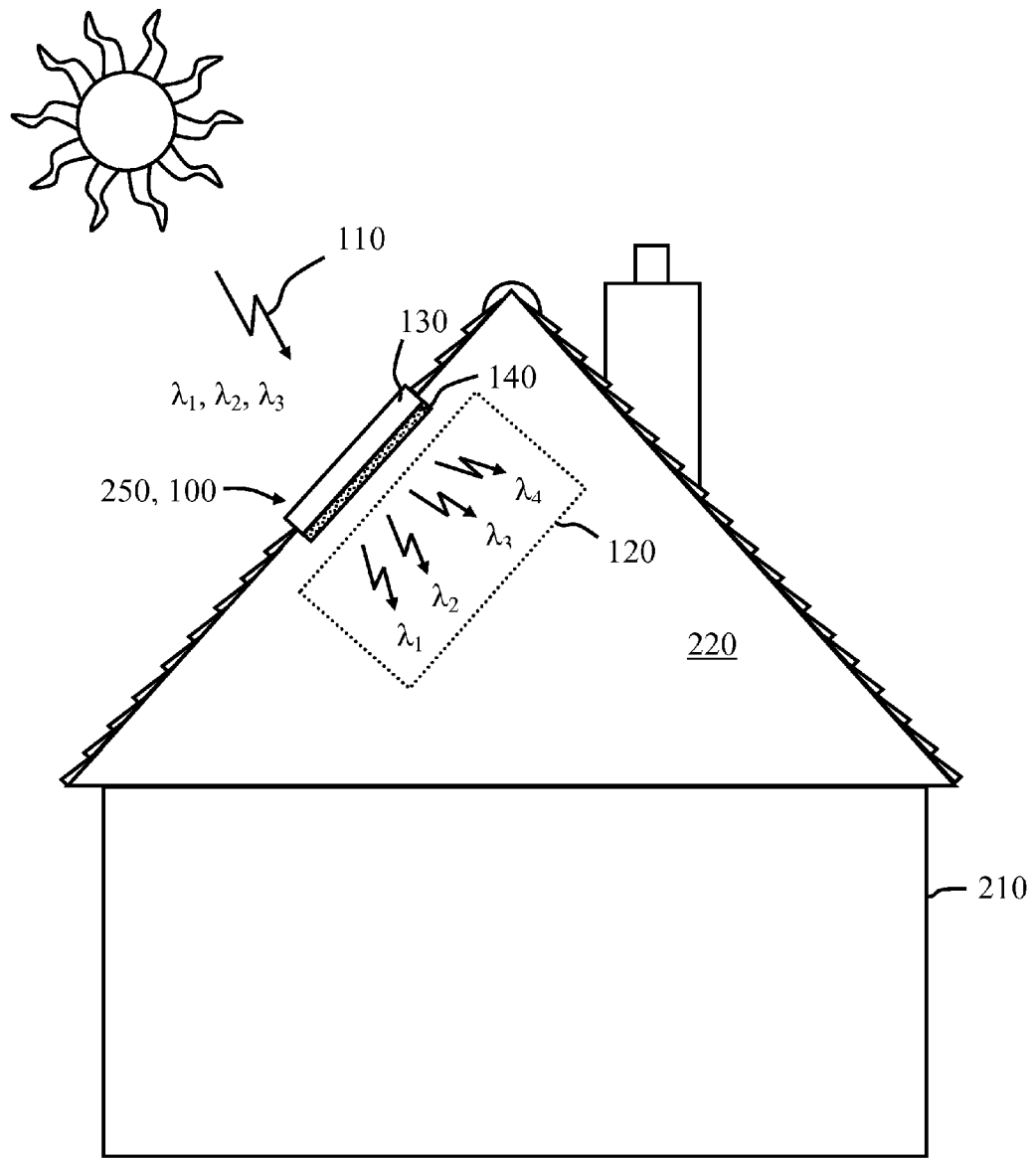
FIG. 10 is a schematic diagram of a skylight in accordance with an embodiment of the invention.

FIG. 10 illustrates a skylight 250 in accordance with some embodiments of the invention. The skylight 250 may be implemented using any of the daylight panels described above with respect to FIGS. 2, 7A-7C, 8A and 8B.

The skylight 250 is a light transmitting fenestration that forms all, or a portion of, a roof or wall of a building or structure. The skylight 250 may be implemented in a structure 210 (e.g., residential, commercial or industrial property) for conveying daylight to the interior 220 of the structure 210. The skylight 250 may be implemented using any of the daylight panels 100 described above with respect to FIGS. 2, 7A-7C, 8A and 8B. Daylight 110 ($\lambda_1$, $\lambda_2$, $\lambda_3$) incident on the skylight 250 is converted to generate a modified daylight emission product 120 that includes the combination of wavelengths $\lambda_1$, $\lambda_2$, $\lambda_3$, transmitted by the daylight panel 100 and the wavelengths $\lambda_4$ of light generated by the photoluminescent material within the daylight panel 100 as described above with respect to FIGS. 2, 7A-7C, 8A and 8B. The surface of the daylight panel facing the daylight may be the light transmissive substrate 130, the wavelength conversion layer 140, or the diffusing layer 150 depending on the embodiment of the daylight panel used. The modified daylight emission product 120 is used to illuminate the interior 220 of a residential/commercial structure 210.

While the skylight 250 in FIG. 10 is depicted as being flat (planar), it is to be noted that the skylight 250 may be implemented in various shapes, forms and sizes depending on its particular application. For example, the skylight 250 may be dome-shaped or arcuate in form. Additionally, the skylight 250 may be implemented with a daylight panel that utilizes a uniform distribution of the one or more phosphor materials or a selective distribution or patterning of the one or more phosphor materials depending on the application.

By configuring the photoluminescent material of the daylight panel 100 that forms the skylight 250 with different combinations and distributions of the one or more phosphor materials, an emission product of the daylight panel can have a spectrum with a higher power density of orange and red light and a lower power density of UV to blue light, which results in a "warm white" or "warmer white" CCT that is can be more preferable for use in offices and homes. Also, as mentioned above, by converting shorter wavelengths of daylight (e.g., blue, violet, UV) into longer wavelengths (e.g., orange and red) using the daylight panel, more lumens can be generated for the emission product without sacrificing visible portions of the blue spectrum.

Figure 11:
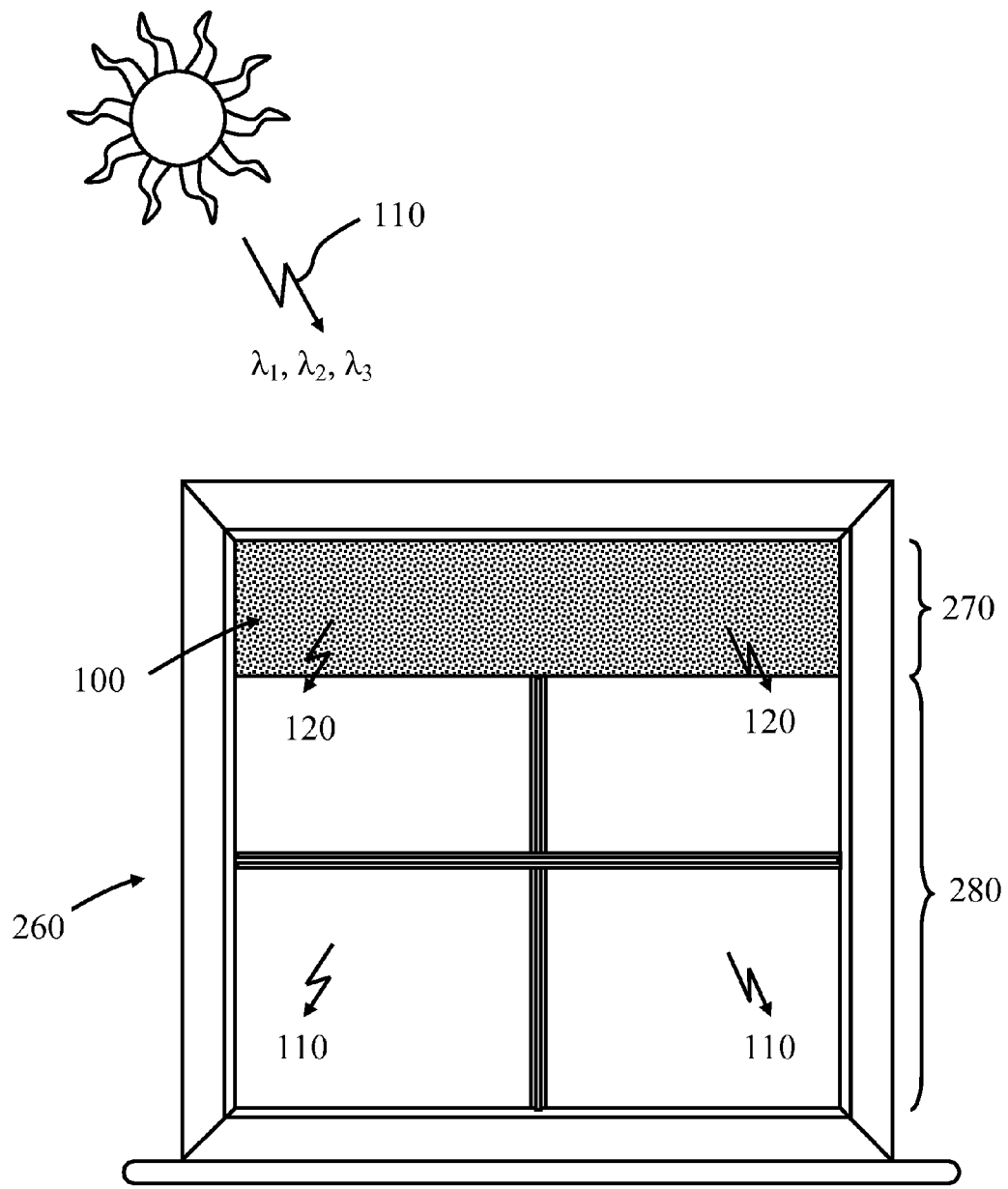
FIG. 11 is a schematic diagram of a window in accordance with an embodiment of the invention.

FIG. 11 illustrates a window 260 in accordance with some embodiments of the invention. A portion of the window 270 (upper in FIG. 11) may be implemented using any of the daylight panels described above with respect to FIGS. 2, 7A-7C, 8A and 8B.

The window 260 is a transparent or translucent opening in a wall or door that allows the passage of light. The window 260 may be implemented in a structure (e.g., residential, commercial or industrial property) for conveying daylight to the interior of the structure. Daylight 110 incident on the portion 270 of the window 260 implementing the daylight panel 100 is converted into an modified daylight emission product as described above with respect to FIGS. 2, 7A-7C, 8A and 8B, which is combined with daylight transmitted through a portions 280 of the window 260 that do not implement the daylight panel to illuminate the residential/commercial environment. The surface of the daylight panel 100 facing the daylight may be the light transmissive substrate, the wavelength conversion layer, or the diffusing layer depending on the embodiment of the daylight panel used. Furthermore, a diffusing layer may be used on both sides of the portion 260 of the window 260 to improve the visual appearance of the portion 260 of the window, as discussed above with respect to FIGS. 7A-7C.

The window 260 may be implemented in various shapes in sizes depending on its particular application. Additionally, the window 260 may be implemented with a daylight panel that utilizes a uniform distribution of the one or more phosphor materials or a selective distribution or patterning of the one or more phosphor materials depending on the application.

While the window 260 in FIG. 10 is depicted as implementing the daylight panel in only a top portion 270, other configurations of the window implementing the daylight panel may also be used. In some embodiments, the entire window may be implemented using the daylight panels described above with respect to FIGS. 2, 7A-7C, 8A and 8B. In other embodiments, different combinations of different portions of the window 260 may be implemented using the daylight panels described above with respect to FIGS. 2, 7A-7C, 8A and 8B. In yet another embodiment, the daylight panel may be implemented onto a shade for the window, e.g., where the shade is rolled up or down to change the amount of daylight that is converted to phosphor light. In this embodiment, the material of the shade provides a flexible substrate for the deposition of the appropriate phosphor material(s).

By configuring the photoluminescent material of the daylight panel that forms portions of the window with different combinations and distributions of the one or more phosphor materials, an emission product of the daylight panel can have a spectrum with a higher power density of orange and red light and a lower power density of UV to blue light, which results in a "warm white" or "warmer white" CCT. The "warm white" or "warmer white" modified daylight emission product of the portions of the window panel that implement the daylight panel are combined with daylight transmitted through portions of the window panel that do not implement the daylight panel to generate light with a CCT that can be more preferable for use in offices and homes.

Also, as mentioned above, by converting shorter wavelengths of daylight (e.g., blue, violet, UV) into longer wavelengths (e.g., orange and red) using the daylight panel, more lumens can be generated for the emission product without sacrificing visible portions of the blue spectrum.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A photoluminescent daylight panel for converting higher energy shorter wavelength daylight to lower energy longer wavelength light, the panel comprising:
   a light transmissive substrate; and
   at least one photoluminescent material configured to absorb at least a portion of daylight radiation of wavelengths between about 350 nm and about 450 nm and convert it to light with a wavelength greater than about 600 nm;
   wherein the at least one photoluminescent material is incorporated within the light transmissive substrate.

2. The panel of claim 1, wherein the at least one photoluminescent material comprises one or more phosphors.

3. The panel of claim 1, wherein the at least one photoluminescent material comprises quantum dots.

4. The panel of claim 1, wherein the at least one photoluminescent material comprises an orange silicate-based phosphor of general composition $A_3Si(O,D)_5$ in which A is at least one of Sr, Ba, Mg and Ca and D is a at least one of Cl, F, N and S.

5. The panel of claim 4, wherein the silicate-based orange phosphor has a formula $(Sr_{1-x}M_x)_y Eu_z SiO_5$, in which M is at least one of a divalent metal Ba, Mg, Ca and Zn; $0 \leq x \leq 0.5$; $2.6 \leq y \leq 3.3$; $0.001 \leq z \leq 0.5$ and y is not 3 when M is Ba.

6. The panel of claim 1, wherein the at least one photoluminescent material comprises an aluminum-silicate-based orange phosphor of general composition $(Sr_{1-x-y}M_xT_y)_{3-m}Eu_m(Si_{1-z}Al_z)O_5$, in which M is at least one of a divalent metal Ba, Mg, and Ca; T is a trivalent metal Y, La, Ce, Pr, Nd, Pm, Sm, Gd, Tb, Dy, Ho, Er, Tm, Yb, Lu, Th, Pa and U; $0 \leq x \leq 0.4$; $0 \leq y \leq 0.4$; $0 \leq z \leq 0.2$; and $0.001 \leq m \leq 0.5$.

7. The panel of claim 6, wherein the aluminum-silicate-based orange phosphor further comprises a halogen F, Cl or Br.

8. The panel of claim 7, wherein the halogen resides on oxygen lattice sites within silicate crystal.

9. The panel of claim 1, wherein the at least one photoluminescent material is a silicate-based yellow phosphor of general composition $A_2Si(O,D)_4$ in which A comprises at least one Sr, Ca, Ba, Mg, Zn and Cd and D is a is at least one F, Cl, Br, I, P, S and N.

10. The panel of claim 9, wherein the dopant D is present in the phosphor in an amount ranging from about 0.01 to 20 mole percent.

11. The panel of claim 10, wherein at least some of the dopant substitutes for oxygen anions to become incorporated into the crystal lattice of the phosphor.

12. The panel of claim 9, wherein the silicate-based yellow phosphor has the formula $(Sr_{1-x}Ba_xM_y)_2Si(O,D)_4:Eu^{2+}$ in which $0 \leq x \leq 1$ and where $0 \leq y \leq 1$ when M is Ca; $0 \leq y \leq 1$ when M is Mg; and $0 \leq y \leq 1$ when M is Zn and Cd.

13. The panel of claim 1, wherein the at least one photoluminescent material is a phosphor selected from the group consisting of:

$Sr_{1.36}Ba_{0.55}Mg_{0.05}Eu_{0.10}Si_{1.03}O_4Cl_{0.18}$;
$Sr_{1.6}Ba_{0.35}Mg_{0.05}Eu_{0.06}Si_{1.03}O_4Cl_{0.12}$;
$Sr_{1.57}Ba_{0.34}Mg_{0.05}Eu_{0.10}Si_{1.03}O_4Cl_{0.18}$;
$Sr_{.64}Ba_{0.27}Mg_{0.05}Eu_{0.10}Si_{1.03}O_4Cl_{0.18}$;
$Sr_3Eu_{0.06}Si_{1.02}O_5F_{0.18}$;
$Sr_{2.94}Ba_{0.06}Eu_{0.06}Si_{1.02}O_5F_{0.18}$;
$(Sr_{0.9}Ba_{0.1})_{2.76}Eu_{0.06}Si_{1.02}O_5F_{0.18}$;
$(Sr_{0.87}Ba_{0.1}Y_{0.03})_{2.94}Eu_{0.06}(Si_{0.9}Al_{0.1})O_5F_{0.18}$;
and combinations thereof.

14. The panel of claim 1, wherein the light transmissive substrate is planar.

15. A photoluminescent daylight panel for converting higher energy shorter wavelength daylight to lower energy longer wavelength light, the panel comprising:
a light transmissive substrate; and
at least one photoluminescent material configured to absorb at least a portion of daylight radiation of wavelengths between about 350 nm and about 450 nm and convert it to light with a wavelength greater than about 600 nm;
wherein the at least one photoluminescent material is distributed in a wavelength conversion layer on the light transmissive substrate; and
further comprising a light diffusing layer on a surface of the layer of at least one photoluminescent material.

16. The panel of claim 15, and further comprising a further light transmissive substrate, the wavelength conversion layer being located between the light transmissive substrate and the further light transmissive substrate.

17. The panel of claim 15, wherein the light transmissive substrate is planar.

18. The panel of claim 15, wherein the at least one photoluminescent material comprises one or more phosphors or quantum dots.

19. The panel of claim 15, wherein the at least one photoluminescent material comprises an orange silicate-based phosphor of general composition $A_3Si(O,D)_5$ in which A is at least one of Sr, Ba, Mg and Ca and D is a at least one of Cl, F, N and S, or wherein the at least one photoluminescent material comprises an aluminum-silicate-based orange phosphor of general composition $(Sr_{1-x-y}M_xT_y)_{3-m}Eu_m(Si_{1-z}Al_z)O_5$, in which M is at least one of a divalent metal Ba, Mg, and Ca; T is a trivalent metal Y, La, Ce, Pr, Nd, Pm, Sm, Gd, Tb, Dy, Ho, Er, Tm, Yb, Lu, Th, Pa and U; $0 \leq x \leq 0.4$; $0 \leq y \leq 0.4$; $0 \leq z \leq 0.2$; and $0.001 < m < 0.5$.

20. The panel of claim 19, wherein the silicate-based orange phosphor has a formula $(Sr_{1-x}M_x)_yEu_zSiO_5$, in which M is at least one of a divalent metal Ba, Mg, Ca and Zn; $0 < x \leq 0.5$; $2.6 \leq y \leq 3.3$; $0.001 \leq z \leq 0.5$ and y is not 3 when M is Ba, or wherein the aluminum-silicate-based orange phosphor further comprises a halogen F, Cl or Br.

21. The panel of claim 20, wherein the halogen resides on oxygen lattice sites within silicate crystal.

22. The panel of claim 15, wherein the at least one photoluminescent material is a silicate-based yellow phosphor of general composition $A_2Si(O,D)_4$ in which A comprises at least one Sr, Ca, Ba, Mg, Zn and Cd and D is a is at least one F, Cl, Br, I, P, S and N.

23. The panel of claim 22, wherein the dopant D is present in the phosphor in an amount ranging from about 0.01 to 20 mole percent.

24. The panel of claim 23, wherein at least some of the dopant substitutes for oxygen anions to become incorporated into the crystal lattice of the phosphor.

25. The panel of claim 22, wherein the silicate-based yellow phosphor has the formula $(Sr_{1-x}Ba_xM_y)_2Si(O,D)_4:Eu^{2+}$ in which $0 \leq x \leq 1$ and where $0 \leq y \leq 1$ when M is Ca; $0 \leq y \leq 1$ when M is Mg; and $0 \leq y \leq 1$ when M is Zn and Cd.

26. The panel of claim 15, wherein the at least one photoluminescent material is a phosphor selected from the group consisting of:

$Sr_{1.36}Ba_{0.55}Mg_{0.05}Eu_{0.10}Si_{1.03}O_4Cl_{0.18}$;
$Sr_{1.6}Ba_{0.35}Mg_{0.05}Eu_{0.06}Si_{1.03}O_4Cl_{0.12}$;
$Sr_{1.57}Ba_{0.34}Mg_{0.05}Eu_{0.10}Si_{1.03}O_4Cl_{0.18}$;
$Sr_{0.64}Ba_{0.27}Mg_{0.05}Eu_{0.10}Si_{1.03}O_4Cl_{0.18}$;
$Sr_3Eu_{0.06}Si_{1.02}O_5F_{0.18}$;
$Sr_{2.94}Ba_{0.06}Eu_{0.06}Si_{1.02}O_5F_{0.18}$;
$(Sr_{0.9}Ba_{0.1})_{2.76}Eu_{0.06}Si_{1.02}O_5F_{0.18}$;
$(Sr_{0.87}Ba_{0.1}Y_{0.03})_{2.94}Eu_{0.06}(Si_{0.9}Al_{0.1})O_5F_{0.18}$;
and combinations thereof.

27. A light tube for providing daylight to an interior of a structure, comprising:
a first light transmissive surface exposed to the daylight;
a second light transmissive surface exposed to the interior of the structure; and
a light reflective tubular chamber for guiding light between the first surface and the second surface; and
at least one photoluminescent material for converting higher energy shorter wavelength daylight to lower energy longer wavelength light, the at least one photoluminescent material configured to absorb at least a portion of daylight radiation of wavelengths between about 350 nm and about 450 nm and convert it to light with a wavelength greater than about 600 nm.

28. The light tube of claim 27, wherein the first surface includes the at least one photoluminescent material.

29. The light tube of claim 27, wherein the second surface includes the photoluminescent material.

30. The light tube of claim 27, wherein the photoluminescent material is distributed in a light transmissive substrate located between the first and second surfaces.

31. The light tube of claim 27, wherein the photoluminescent material is distributed in a wavelength conversion layer, the wavelength conversion layer and a light transmissive substrate forming a panel that is situated between the first and second surfaces.

32. The light tube of claim 31, wherein the panel covers at least a part of an inner surface of the light tube.

33. The light tube of claim 27, wherein the at least one photoluminescent material comprises an orange silicate-based phosphor of general composition $A_3Si(O,D)_5$ in which A is at least one of Sr, Ba, Mg and Ca and D is a at least one of Cl, F, N and S.

34. The light tube of claim 33, wherein the silicate-based orange phosphor has a formula $(Sr_{1-x}M_x)_yEu_zSiO_5$, in which M is at least one of a divalent metal Ba, Mg, Ca and Zn; $0<x\leq0.5$; $2.6\leq y\leq3.3$; $0.001\leq z\leq0.5$ and y is not 3 when M is Ba.

35. The light tube of claim 27, wherein the at least one photoluminescent material comprises an aluminum-silicate-based orange phosphor of general composition $(Sr_{1-x-y}M_x T_y)_{3-m}Eu_m(Si_{1-z}Al_z)O_5$, in which M is at least one of a divalent metal Ba, Mg, and Ca; T is a trivalent metal Y, La, Ce, Pr, Nd, Pm, Sm, Gd, Tb, Dy, Ho, Er, Tm, Yb, Lu, Th, Pa and U; $0\leq x\leq0.4$; $0\leq y\leq0.4$; $0\leq z\leq0.2$; and $0.001\leq m\leq0.5$.

36. The light tube of claim 35, wherein the aluminum-silicate-based orange phosphor further comprises a halogen F, Cl or Br.

37. The light tube of claim 36, wherein the halogen resides on oxygen lattice sites within the silicate crystal.

38. The light tube of claim 27, wherein the at least one photoluminescent material is a silicate-based yellow phosphor of general composition $A_2Si(O,D)_4$ in which A comprises at least one Sr, Ca, Ba, Mg, Zn and Cd and D is a is at least one F, Cl, Br, I, P, S and N.

39. The light tube of claim 38, wherein the dopant D is present in the phosphor in an amount ranging from about 0.01 to 20 mole percent.

40. The light tube of claim 39, wherein at least some of the dopant substitutes for oxygen anions to become incorporated into the crystal lattice of the phosphor.

41. The light tube of claim 31, wherein the silicate-based yellow phosphor has the formula $(Sr_{1-x}Ba_xM_y)_2Si(O,D)_4$: $Eu^{2+}$ in which $0\leq x\leq1$ and where $0\leq y\leq1$ when M is Ca; $0\leq y\leq1$ when M is Mg; and $0\leq y\leq1$ when M is Zn and Cd.

42. The light tube of claim 27, wherein the at least one photoluminescent material is a phosphor selected from the group consisting of:

$Sr_{1.36}Ba_{0.55}Mg_{0.55}Eu_{0.10}Si_{1.03}O_4Cl_{0.18}$;
$Sr_{1.6}Ba_{0.35}Mg_{0.05}Eu_{0.06}Si_{1.03}O_4Cl_{0.12}$;
$Sr_{1.57}Ba_{0.34}Mg_{0.05}Eu_{0.10}Si_{1.03}O_4Cl_{0.18}$;
$Sr_{0.64}Ba_{0.27}Mg_{0.05}Eu_{0.10}Si_{1.03}O_4Cl_{0.18}$;
$Sr_3Eu_{0.06}Si_{1.02}O_5F_{0.18}$;
$Sr_{2.94}Ba_{0.06}Eu_{0.06}Si_{1.02}O_5F_{0.18}$;
$(Sr_{0.9}Ba_{0.1})_{2.76}Eu_{0.06}Si_{1.02}O_5F_{0.18}$;
$(Sr_{0.87}Ba_{0.1}Y_{0.03})_{2.94}Eu_{0.06}(Si_{0.9}Al_{0.1})O_5F_{0.18}$;
and combinations thereof.

* * * * *